US00RE48114E

(19) United States
(12) Reissued Patent
Lee et al.

(10) Patent Number: US RE48,114 E
(45) Date of Reissued Patent: Jul. 21, 2020

(54) METHOD FOR SETTING CYCLIC SHIFT CONSIDERING FREQUENCY OFFSET

(71) Applicant: LG ELECTRONICS INC., Seoul (KR)

(72) Inventors: Hyun Woo Lee, Anyang-si (KR); Min Seok Noh, Anyang-si (KR); Yeong Hyeon Kwon, Anyang-si (KR); Seung Hee Han, Anyang-si (KR); Dong Cheol Kim, Anyang-si (KR); Jin Sam Kwak, Anyang-si (KR); Dragan Vujcic, Limours (FR)

(73) Assignee: LG ELECTRONICS INC., Seoul (KR)

(21) Appl. No.: 15/012,730

(22) Filed: Feb. 1, 2016

Related U.S. Patent Documents

Reissue of:
(64) Patent No.: 8,693,573
Issued: Apr. 8, 2014
Appl. No.: 13/791,730
Filed: Mar. 8, 2013

U.S. Applications:
(63) Continuation of application No. 13/369,172, filed on Feb. 8, 2012, now Pat. No. 8,401,113, which is a (Continued)

(30) Foreign Application Priority Data

Feb. 5, 2007 (KR) ..... 10-2007-0011772
Oct. 11, 2007 (KR) ..... 10-2007-0102563

(51) Int. Cl.
*G06F 3/048* (2013.01)
*H04L 1/00* (2006.01)
(Continued)

(52) U.S. Cl.
CPC ..... *H04L 1/0023* (2013.01); *H04J 13/0062* (2013.01); *H04J 13/0074* (2013.01);
(Continued)

(58) Field of Classification Search
CPC .... H04J 13/0062; H04J 13/0074; H04J 13/22; H04L 1/0023; H04L 27/2657; H04L 27/2613; H04W 56/00
(Continued)

(56) References Cited

U.S. PATENT DOCUMENTS 6,442,220 B1 8/2002 Sihlbom
7,072,462 B2 7/2006 Smith et al.
(Continued)

FOREIGN PATENT DOCUMENTS

CN 1261757 8/2000
CN 1674467 9/2005
(Continued)

OTHER PUBLICATIONS

Office Action issued in Taiwan Application No. 104102380, dated Jul. 1, 2016, 1 page.
(Continued)

*Primary Examiner* — Dennis G Bonshock
(74) *Attorney, Agent, or Firm* — Lee, Hong, Degerman, Kang & Waimey

(57) ABSTRACT

A method for transmitting a random access preamble to a base station includes generating the random access preamble from a Zadoff-Chu (ZC) sequence, wherein the random access preamble is defined by cyclic shift ($C_v$) of the ZC sequence; and transmitting the random access preamble to the base station.

12 Claims, 22 Drawing Sheets

Related U.S. Application Data continuation of application No. 12/840,230, filed on Jul. 20, 2010, now Pat. No. 8,144,805, which is a continuation of application No. 11/969,834, filed on Jan. 4, 2008, now Pat. No. 7,792,212.

(60) Provisional application No. 60/883,754, filed on Jan. 5, 2007, provisional application No. 60/884,398, filed on Jan. 10, 2007, provisional application No. 60/915,096, filed on Apr. 30, 2007, provisional application No. 60/941,562, filed on Jun. 1, 2007.

(51) Int. Cl.
*H04J 13/00* (2011.01)
*H04W 56/00* (2009.01)
*H04L 27/26* (2006.01)
*H04J 13/22* (2011.01)

(52) U.S. Cl.
CPC ..... *H04L 27/2613* (2013.01); *H04L 27/2657* (2013.01); *H04W 56/00* (2013.01); *H04J 13/22* (2013.01)

(58) Field of Classification Search
USPC ..... 375/295, 260, 343, 355; 370/338; 455/452.1
See application file for complete search history.

(56) References Cited

U.S. PATENT DOCUMENTS

| | | | | |
|---|---|---|---|---|
| 7,881,364 | B2 | 2/2011 | Noh et al. | |
| 8,098,745 | B2 | 1/2012 | Bertrand et al. | |
| 8,144,746 | B2 | 3/2012 | Iwai et al. | |
| 8,199,778 | B2 * | 6/2012 | Shimomura | H04W 74/004 370/328 |
| 8,218,496 | B2 | 7/2012 | Bertrand et al. | |
| 8,441,915 | B2 | 5/2013 | Hao et al. | |
| 8,457,257 | B2 | 6/2013 | Cheng et al. | |
| 8,693,573 | B2 | 4/2014 | Han et al. | |
| 2002/0118635 | A1 | 8/2002 | Nee | |
| 2005/0164708 | A1 | 7/2005 | Gabriel et al. | |
| 2005/0232158 | A1 | 10/2005 | Hondo | |
| 2005/0286409 | A1 | 12/2005 | Yoon et al. | |
| 2005/0286465 | A1 | 12/2005 | Zhuang | |
| 2006/0050799 | A1 | 3/2006 | Hou et al. | |
| 2006/0056528 | A1 | 3/2006 | Jung et al. | |
| 2007/0165567 | A1 | 7/2007 | Tan et al. | |
| 2007/0211671 | A1 | 9/2007 | Cha | |
| 2007/0230600 | A1 * | 10/2007 | Bertrand | H04J 13/00 375/260 |
| 2008/0080472 | A1 * | 4/2008 | Bertrand | H04J 11/005 370/344 |
| 2008/0101306 | A1 | 5/2008 | Bertrand et al. | H04L 27/2613 370/336 |
| 2008/0162903 | A1 | 7/2008 | Yamazaki | |
| 2008/0235314 | A1 | 9/2008 | Lee et al. | |
| 2008/0260056 | A1 | 10/2008 | Du et al. | |
| 2008/0316961 | A1 | 12/2008 | Bertrand et al. | |
| 2009/0073944 | A1 | 3/2009 | Jiang et al. | |
| 2009/0109919 | A1 | 4/2009 | Bertrand et al. | |
| 2009/0116459 | A1 | 5/2009 | Do | |
| 2009/0203384 | A1 | 8/2009 | Vujcic | |
| 2009/0225701 | A1 | 9/2009 | Kwon et al. | |
| 2009/0252112 | A1 * | 10/2009 | Shimomura | H04L 5/0007 370/330 |
| 2009/0290662 | A1 | 11/2009 | Han et al. | |
| 2009/0305693 | A1 | 12/2009 | Shimomura et al. | |
| 2010/0002804 | A1 | 1/2010 | Ogawa et al. | |
| 2010/0039997 | A1 | 2/2010 | Ratasuk et al. | |
| 2010/0067461 | A1 | 3/2010 | Kwak et al. | |
| 2010/0067591 | A1 | 3/2010 | Luo et al. | |
| 2010/0074130 | A1 | 3/2010 | Bertrand et al. | |
| 2010/0105405 | A1 | 4/2010 | Vujcic | |
| 2010/0220664 | A1 * | 9/2010 | Hooli et al. | 370/329 |
| 2010/0226413 | A1 | 9/2010 | Muharemovic et al. | |
| 2011/0007825 | A1 * | 1/2011 | Hao et al. | 375/259 |
| 2011/0013715 | A1 | 1/2011 | Lee et al. | |
| 2011/0014909 | A1 | 1/2011 | Han et al. | |
| 2011/0032926 | A1 | 2/2011 | Xia et al. | |
| 2011/0086658 | A1 | 4/2011 | Baldemair | |
| 2011/0150156 | A1 * | 6/2011 | Xue et al. | 375/354 |
| 2011/0176406 | A1 | 7/2011 | Mauritz | |
| 2011/0200002 | A1 | 8/2011 | Han et al. | |
| 2011/0212745 | A1 | 9/2011 | Papasakellariou | |
| 2012/0026952 | A1 | 2/2012 | Okubo et al. | |
| 2012/0051292 | A1 | 3/2012 | Mauritz | |
| 2012/0069933 | A1 * | 3/2012 | Hao et al. | 375/308 |
| 2012/0140844 | A1 | 6/2012 | Lee et al. | |
| 2012/0263214 | A1 * | 10/2012 | Lee et al. | 375/219 |
| 2015/0237656 | A1 * | 8/2015 | Kwon | H04W 74/0833 370/330 |

FOREIGN PATENT DOCUMENTS

| | | |
|---|---|---|
| CN | 1747461 | 3/2006 |
| CN | 1879321 | 12/2006 |
| EP | 1505847 | 2/2005 |
| KR | 10-2003-0056513 | 7/2003 |
| KR | 10-2006-0046498 | 5/2006 |
| KR | 10-2006-0082744 | 7/2006 |
| KR | 10-2006-0121449 | 11/2006 |
| KR | 1020070102121 | 10/2007 |
| KR | 1020080015355 | 2/2008 |
| KR | 10-2008-0037495 | 4/2008 |
| TW | 496096 | 7/2002 |
| TW | 533699 | 5/2003 |
| WO | 00/76248 | 12/2000 |
| WO | 2000/076248 | 12/2000 |
| WO | 03/019808 | 3/2003 |
| WO | 2008/081311 | 7/2008 |

OTHER PUBLICATIONS

The State Intellectual Property Office of the People's Republic of China Application Serial No. 201210123409.3, Office Action dated Jan. 23, 2014, 6 pages.

Taiwan Intellectual Property Office Application Serial No. 104102379, Office Action dated Sep. 2, 2016, 3 pages.

3rd Generation Partnership Project (3GPP), "Technical Specification Group Radio Access Network; Evolved Universal Terrestrial Radio Access (E-UTRA); Evolved Universal Terrestrial Radio Access (E-UTRA); Physical Channels and Modulation (Release 8)," 3GPP TS 36.211 V8.1.0, Nov. 2007, 54 pages.

European Patent Office Application Serial No. 18176019.0, Search Report dated Sep. 20, 2018, 7 pages.

United States Patent and Trademark Office U.S. Appl. No. 16/132,316, Notice of Allowance dated May 21, 2019, 10 pages.

LG Electronics, "RACH Design Under Frequency Offset," 3GPP TSG-RAN WG1 Meeting #47, R1-063162, Nov. 2006, 7 pages.

Texas Instruments, "Configurable Cyclic Shift for Non-Synchronized Random Access Preamble," 3GPP TSG-RAN WG1 #46bis, R1-062631, Oct. 2006, 3 pages.

Texas Instruments, "Non-Synchronized Random Access Design for High Doppler Conditions," 3GPP TSG-RAN WG1 #47, R1-063214, Nov. 2006, 7 pages.

LG Electronics, et al., "Comparison of Formula for Restricted Cyclic Shift Set," 3GPP TSG RAN WG1 Meeting #49bis, R1-073060, Jun. 2007, 6 pages.

LG Electronics, "Formula for Restricted Cyclic Shift Set," 3GPP TSG RAN WG1 Meeting #49, R1-072331, May 2007, 8 pages.

Nokia, "Restricted Sets of RACH Preamble Signatures for Environments With High Doppler Shifts," 3GPP TSG RAN WG1 #47bis, R1-070377, Jan. 2007, 6 pages.

LG Electronics, "Ways to Mitigate Frequency Offset with CAZAC Cyclic Shift," 3GPP TSG RAN WG1 Meeting #47bis, R1-070227, Jan. 2007, 8 pages.

(56) References Cited

OTHER PUBLICATIONS

Lucent Technologies, "RACH in Support of High-Speed UEs," R1-062387, 3GPP TSG-RAN WG1 #46, Aug. 2006, XP-050102905, 10 pages.
Korean Intellectual Property Office Application Serial No. 10-2007-0011772, Notice of Allowance dated Aug. 30, 2013, 2 pages.
United States Patent and Trademark Office U.S. Appl. No. 13/847,987, Office Action dated Jul. 18, 2013, 8 pages.

* cited by examiner

Equivalent Cyclic shift = 2M+T or 3M
[First order F0 mitigation]

METHOD FOR SETTING CYCLIC SHIFT CONSIDERING FREQUENCY OFFSET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is *a reissue application of U.S. Pat. No. 8,693,573 B2, which issued on Apr. 8, 2014, from U.S. patent application Ser. No. 13/791,730, filed on Mar. 8, 2013, which is* a continuation of U.S. patent application Ser. No. 13/369,172, filed on Feb. 8, 2012, now U.S. Pat. No. 8,401,113, which is a continuation of U.S. patent application Ser. No. 12/840,230, filed on Jul. 20, 2010, now U.S. Pat. No. 8,144,805, which is a continuation of U.S. patent application Ser. No. 11/969,834, filed Jan. 4, 2008, now U.S. Pat. No. 7,792,212, which claims the benefit of earlier filing date and right of priority to Korean Patent Application Nos. 10-2007-0011772, filed on Feb. 5, 2007, and 10-2007-00102563, filed on Oct. 11, 2007, and also claims the benefit of U.S. Provisional Application Ser. Nos. 60/883,754, filed on Jan. 5, 2007, 60/884,398, filed on Jan. 10, 2007, 60/915,096, filed on Apr. 30, 2007 and 60/941,562, filed on Jun. 1, 2007, the contents of which are all hereby incorporated by reference herein in their entirety.

BACKGROUND OF THE INVENTION

1. Field of the Invention

The present invention relates to a sequence of a wireless communication system, and more particularly to a method for establishing a cyclic shift in consideration of characteristics of a CAZAC sequence in order to solve the problem of a frequency offset.

2. Discussion of the Related Art

A Constant Amplitude Zero Auto-Correlation (CAZAC) sequence is a representative one of various sequences which have been intensively discussed in the 3GPP LTE.

Channels generally extract a variety of identifiers (IDs) or information using the CAZAC sequence, for example, synchronization channels (e.g., a primary-SCH, a secondary-SCH, and a BCH) for downlink synchronization, other synchronization channels (e.g., a RACH) for uplink synchronization, and pilot channels (e.g., a data pilot, and a channel quality pilot). Also, the above-mentioned CAZAC sequence has been used to perform the scrambling.

Two kinds of methods have been used for the CAZAC sequence, i.e., a first method for changing a root index to another, and employing the changed root index, and a second method for performing a cyclic shift (CS) on a single root sequence, and employing the CS-result.

If a current root index is changed to a new root index, a low cross-correlation occurs between the current root index and the new root index, however, there is no limitation in designing sequence usages.

In the case of the cyclic shift, zero cross-correlation exists between the current root index and the new root index, so that the two root indexes are used when each of the root indexes require a high rejection ratio. Specifically, when time-frequency resources are shared in the same cell and data/control signals are transmitted, the above-mentioned two root indexes are adapted to discriminate among different signals or UEs.

A representative example of CAZAC sequences is a Zadoff-Chu (ZC) sequence, and the Zadoff-Chu sequence can be defined by the following equation 1:

$$x_u(n) = \exp\left(\frac{ju\pi n(n+1)}{N_{ZC}}\right) \text{ for odd } N_{ZC} \qquad \text{[Equation 1]}$$

$$x_u(n) = \exp\left(\frac{ju\pi n^2}{N_{ZC}}\right) \text{ for even } N_{ZC}$$

where "n" is indicative of a sampling index, "Nzc" is indicative of the length of the ZC sequence, and "u" is indicative of the root index of the ZC sequence.

However, if the offset occurs in a frequency domain in the same manner as in the case where the CAZAC sequence is transmitted using the OFDM scheme, a performance or false alarm or throughput may be excessively deteriorated.

Specifically, if the cyclic shift (CS) is applied to the CAZAC sequence, the frequency offset or the timing offset excessively occurs, so that it is difficult to discriminate between sequences.

SUMMARY OF THE INVENTION

Accordingly, the present invention is directed to a method for establishing a cyclic shift (CS) considering a frequency offset that substantially obviates one or more problems due to limitations and disadvantages of the related art.

An object of the present invention is to provide a method for establishing a cyclic shift (CS) to provide against a frequency offset, so that it can easily prevent a sequence (e.g., a CAZAC sequence) from being deteriorated under the condition that the frequency offset occurs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for setting cyclic shift to be applied to a given sequence against an effect of a high Doppler frequency higher than a predetermined value is provided. According to the method, the method comprises: acquiring a first variable ($d_u$) of cyclic shift corresponding to a Doppler shift of one subcarrier spacing by using an root index (u) of the given sequence; acquiring secondary variables comprising a number of group (G) comprised in the given sequence, a length of the each group (S) and a number of cyclic shift per the group (P) using the first variable ($d_u$); and establishing the cyclic shift to be applied to the given sequence according to the secondary variables.

Preferably, the secondary variables further comprise a number of additional cyclic shifts which are applicable to the given sequence not based on the group (R).

Preferably, the given sequence is a Zadoff-Chu (ZC) sequence, and the first variable is acquired by a equation of, $$d_u = \begin{cases} u^{-1} \bmod N_{ZC}, & 0 \le (u^{-1} \bmod N_{ZC}) < N_{ZC}/2 \\ N_{ZC} - (u^{-1} \bmod N_{ZC}), & N_{ZC}/2 \le (u^{-1} \bmod N_{ZC}) < N_{ZC} \end{cases}$$

wherein "u" indicates the root index of the ZC sequence and "$N_{ZC}$" corresponds to a length of the ZC sequence.

And, in this case, the secondary variables are differently acquired according to a range of the first variable ($d_u$), and the range of the first variable is divided by a criteria corresponding to ⅓ of the given sequence length (Nzc/3).

And, if the range of the first variable ($d_u$) is $Ncs \le d_u < (Nzc/3)$, the secondary variables may be acquired by equations of, $$P = \lfloor d_u / N_{CZ} \rfloor$$

$$S = 2 \cdot d_u + P \cdot N_{CS}$$

$$G = \lfloor N_{ZC}/S \rfloor$$

$$R = \max(\lfloor (N_{ZC} - 2 \cdot d_u - G \cdot S)/N_{CS} \rfloor, 0)$$

wherein "$N_{CS}$" is a predetermined cyclic shift parameter, "P" corresponds to the number of cyclic shift per the group, "S" corresponds to the length of the each group, "G" corresponds to the number of group and "R" corresponds to the number of additional cyclic shifts.

On the other hand, if the range of the first variable ($d_u$) is $(Nzc/3) \le d_u \le (Nzc - Ncs)/2$, the secondary variables may be acquired by equations of, $$P = \lfloor (N_{ZC} - 2 \cdot d_u)/N_{CS} \rfloor$$

$$S = N_{ZC} - 2 \cdot d_u + P \cdot N_{CS}$$

$$G = \lfloor d_u / S \rfloor$$

$$R = \min(\max(\lfloor (d_u - G \cdot S)/N_{CS} \rfloor, 0), P)$$

wherein "$N_{CS}$" is a predetermined cyclic shift parameter, "P" corresponds to the number of cyclic shift per the group, "S" corresponds to the length of the each group, "G" corresponds to the number of group and "R" corresponds to the number of additional cyclic shifts.

And, preferable, said establishing the cyclic shift ($C_v$) is performed as a equation of, $$C_v = S \cdot \lfloor v/P \rfloor + (v \bmod P) \cdot N_{CS},\ v = 0, 1, \ldots, (P \cdot G + R - 1).$$

And, the given sequence may be for generating a random access preamble.

In another aspect of the present invention, there is provided a method for setting cyclic shift to be applied to a given sequence, the method comprising: determining whether the cyclic shift is to be established according to a restricted sets restricted due to a Doppler shift; and establishing the cyclic shift to be applied to the given sequence considering a cyclic shift corresponding to a Doppler shift of one subcarrier spacing, when the cyclic shift is determined to be established according to the restricted sets.

Preferably, when the cyclic shift is determined to be established according to the restricted sets, said establishing the cyclic shift to be applied to the given sequence comprises: acquiring a first variable ($d_u$) indicating the cyclic shift corresponding to the Doppler shift of one subcarrier spacing by using an root index (u) of the given sequence; acquiring secondary variables comprising a number of group (G) comprised in the given sequence, a length of the each group (S), a number of cyclic shift per the group (P) using the first variable ($d_u$) and a number of additional cyclic shifts which is applicable to the given sequence not based on the group (R), and establishing the cyclic shift to be applied to the given sequence according to the secondary variables.

Preferably, the given sequence is a Zadoff-Chu (ZC) sequence, and the first variable is acquired by a equation of, $$d_u = \begin{cases} u^{-1} \bmod N_{ZC}, & 0 \le (u^{-1} \bmod N_{ZC}) < N_{ZC}/2 \\ N_{ZC} - (u^{-1} \bmod N_{ZC}), & N_{ZC}/2 \le (u^{-1} \bmod N_{ZC}) < N_{ZC} \end{cases}$$

wherein "u" indicates the root index of the ZC sequence and "$N_{ZC}$" corresponds to a length of the ZC sequence.

And, the secondary variables may be differently acquired according to a range of the first variable ($d_u$), and the range of the first variable is divided by a criteria corresponding to ⅓ of the given sequence length (Nzc/3).

In this case, if the range of the first variable ($d_u$) is $Ncs \le d_u \le (Nzc/3)$, the secondary variables are acquired by equations of, $$P = \lfloor d_u / N_{CS} \rfloor$$

$$S = 2 \cdot d_u + P \cdot N_{CS}$$

$$G = \lfloor N_{ZC}/S \rfloor$$

$$R = \max(\lfloor (N_{ZC} - 2 \cdot d_u - G \cdot S)/N_{CS} \rfloor, 0)$$

wherein "$N_{CS}$" is a predetermined cyclic shift parameter, "P" corresponds to the number of cyclic shift per the group, "S" corresponds to the length of the each group, "G" corresponds to the number of group and "R" corresponds to the number of additional cyclic shifts.

On the other hand, if the range of the first variable ($d_u$) is $(Nzc/3) \le d_u \le (Nzc - Ncs)/2$, the secondary variables are acquired by equations of, $$P = \lfloor (N_{ZC} - 2 \cdot d_u)/N_{CS} \rfloor$$

$$S = N_{ZC} - 2 \cdot d_u + P \cdot N_{CS}$$

$$G = \lfloor d_u / S \rfloor$$

$$R = \min(\max(\lfloor (d_u - G \cdot S)/N_{CS} \rfloor, 0), P)$$

wherein "$N_{CS}$" is a predetermined cyclic shift parameter, "P" corresponds to the number of cyclic shift per the group, "S" corresponds to the length of the each group, "G" corresponds to the number of group and "R" corresponds to the number of additional cyclic shifts.

And, preferably, the cyclic shift ($C_v$) is performed as following equation, $$C_v = \begin{cases} v \cdot N_{CS}, & v = 0, 1, K, (\lfloor N_{ZC}/N_{CS} \rfloor - 1), & \text{for unrestricted sets} \\ S \cdot \lfloor v/P \rfloor + (v \bmod P) \cdot N_{CS}, & v = 0, 1, K, (P \cdot G + R - 1), & \text{for restricted sets} \end{cases}.$$

And, the given sequence may be for generating a random access preamble.

In another aspect of the present invention, there is provided a method for setting cyclic shift to be applied to a given sequence, the method comprising: (a) acquiring a variable of $d_u$ by a equation of, $$d_u = \begin{cases} u^{-1} \bmod N_{ZC}, & 0 \le (u^{-1} \bmod N_{ZC}) < N_{ZC}/2 \\ N_{ZC} - (u^{-1} \bmod N_{ZC}), & N_{ZC}/2 \le (u^{-1} \bmod N_{ZC}) < N_{ZC} \end{cases}$$

wherein "u" indicates an root index of the given sequence and "$N_{ZC}$" corresponds to a length of the given sequence; (b) acquiring variables of G, S, P and R by equations of, $$P=\lfloor d_u/N_{CS} \rfloor$$

$$S=2\cdot d_u+P\cdot N_{CS}$$

$$G=\lfloor N_{ZC}/S \rfloor$$

$$R=\max(\lfloor (N_{ZC}-2\cdot d_u-G\cdot S)/N_{CS} \rfloor,0)$$

when a range of the first variable ($d_u$) is $Ncs \le d_u \le (Nzc/3)$, and acquiring variables of G, S, P and R by equations of, $$P=\lfloor (N_{ZC}-2\cdot d_u)/N_{CS} \rfloor$$

$$S=N_{ZC}-2\cdot d_u+P\cdot N_{CS}$$

$$G=\lfloor d_u/S \rfloor$$

$$R=\min(\max(\lfloor (d_u-G\cdot S)/N_{CS} \rfloor,0),P)$$

when the range of the first variable ($d_u$) is $(Nzc/3) \le d_u \le (Nzc-Ncs)/2$, wherein "$N_{CS}$" is a predetermined cyclic shift parameter; (c) establishing the cyclic shift ($C_v$) by equation of, $$C_v = \begin{cases} v \cdot N_{CS}, & v = 0, 1, K, (\lfloor N_{ZC}/N_{CS} \rfloor - 1), & \text{for unrestricted sets} \\ S \cdot \lfloor v/P \rfloor + (v \bmod P) \cdot N_{CS}, & v = 0, 1, K, (P \cdot G + R - 1), & \text{for restricted sets} \end{cases}$$

wherein the restricted sets are a cyclic shift sets restricted due to a Doppler shift, and the unrestricted sets are a cyclic shift sets not restricted due to the Doppler shift.

In another aspect of the present invention, there is provided a method for transmitting a random access preamble using cyclic shift, the method comprising: acquiring a root index (u) of a sequence for the random access preamble from system information; establishing the cyclic shift to be applied to the sequence, in said establishing, when the cyclic shift is determined to be established according to the restricted sets restricted due to a Doppler shift, the cyclic shift to be applied to the sequence is established by considering a cyclic shift corresponding to a Doppler shift of one subcarrier spacing; generating the sequence according to the root index (u) with the established cyclic shift; and transmitting the sequence with the cyclic shift as the random access preamble.

Preferably, when the cyclic shift is determined to be established according to the restricted sets, said establishing the cyclic shift to be applied to the sequence comprises: acquiring a first variable ($d_u$) indicating the cyclic shift corresponding to the Doppler shift of one subcarrier spacing by using the root index (u) of the given sequence; acquiring secondary variables comprising a number of group (G) comprised in the sequence, a length of the each group (S), a number of cyclic shift per the group (P) using the first variable ($d_u$) and a number of additional cyclic shifts which is applicable to the sequence not based on the group (R), and establishing the cyclic shift to be applied to the sequence according to the secondary variables.

Preferably, wherein the given sequence is a Zadoff-Chu (ZC) sequence, and the first variable is acquired by a equation of, $$d_u = \begin{cases} u^{-1} \bmod N_{ZC}, & 0 \le (u^{-1} \bmod N_{ZC}) < N_{ZC}/2 \\ N_{ZC} - (u^{-1} \bmod N_{ZC}), & N_{ZC}/2 \le (u^{-1} \bmod N_{ZC}) < N_{ZC} \end{cases}$$

wherein "u" indicates the root index of the ZC sequence and "$N_{ZC}$" corresponds to a length of the ZC sequence.

Preferably, wherein the secondary variables are differently acquired according to a range of the first variable ($d_u$), and the range of the first variable is divided by a criteria corresponding to ⅓ of the given sequence length (Nzc/3).

More specifically, if the range of the first variable ($d_u$) is $Ncs \le d_u < (Nzc/3)$, the secondary variables may be acquired by equations of, $$P=\lfloor d_u/N_{CS} \rfloor$$

$$S=2\cdot d_u+P\cdot N_{CS}$$

$$G=\lfloor N_{ZC}/S \rfloor$$

$$R=\max(\lfloor {}^{*}N_{ZC}-2\cdot d_u-G\cdot S)/N_{CS} \rfloor,0)$$

wherein "$N_{CS}$" is a predetermined cyclic shift parameter, "P" corresponds to the number of cyclic shift per the group, "S" corresponds to the length of the each group, "G" corresponds to the number of group and "R" corresponds to the number of additional cyclic shifts.

On the other hand, if the range of the first variable ($d_u$) is $(Nzc/3) \le d_u \le (Nzc-Ncs)/2$, the secondary variables are acquired by equations of, $$P=\lfloor (N_{ZC}-2d_u)/N_{CS} \rfloor$$

$$S=N_{ZC}-2\cdot d_u+P\cdot N_{CS}$$

$$G=\lfloor d_u/S \rfloor$$

$$R=\min(\max(\lfloor (d_u-G\cdot S)/N_{CS} \rfloor,0),P)$$

wherein "$N_{CS}$" is a predetermined cyclic shift parameter, "P" corresponds to the number of cyclic shift per the group, "S" corresponds to the length of the each group, "G" corresponds to the number of group and "R" corresponds to the number of additional cyclic shifts.

And, preferably, wherein the cyclic shift ($C_v$) is performed as following equation, $$C_v = \begin{cases} v \cdot N_{CS}, & v = 0, 1, K, (\lfloor N_{ZC}/N_{CS} \rfloor - 1), & \text{for unrestricted sets} \\ S \cdot \lfloor v/P \rfloor + (v \bmod P) \cdot N_{CS}, & v = 0, 1, K, (P \cdot G + R - 1), & \text{for restricted sets} \end{cases}.$$

It is to be understood that both the foregoing general description and the following detailed description of the present invention are exemplary and explanatory and are intended to provide further explanation of the invention as claimed.

The present invention can easily establish a cyclic shift (CS) interval at a specific location having no overlapping by considering a channel response of a reception (Rx) sequence and an alias location of this reception (Rx) sequence, although a reception (Rx) signal is shifted by a frequency offset irrespective of categories of a domain generating a sequence, so that it can greatly reduce the number of the detection errors and the false alarm rate.

And, if a sequence of the cyclic shift (CS) is allocated to a cell having a frequency offset of more than a predetermined level, the present invention can minimize the influence of a frequency offset on a high-mobility cell.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
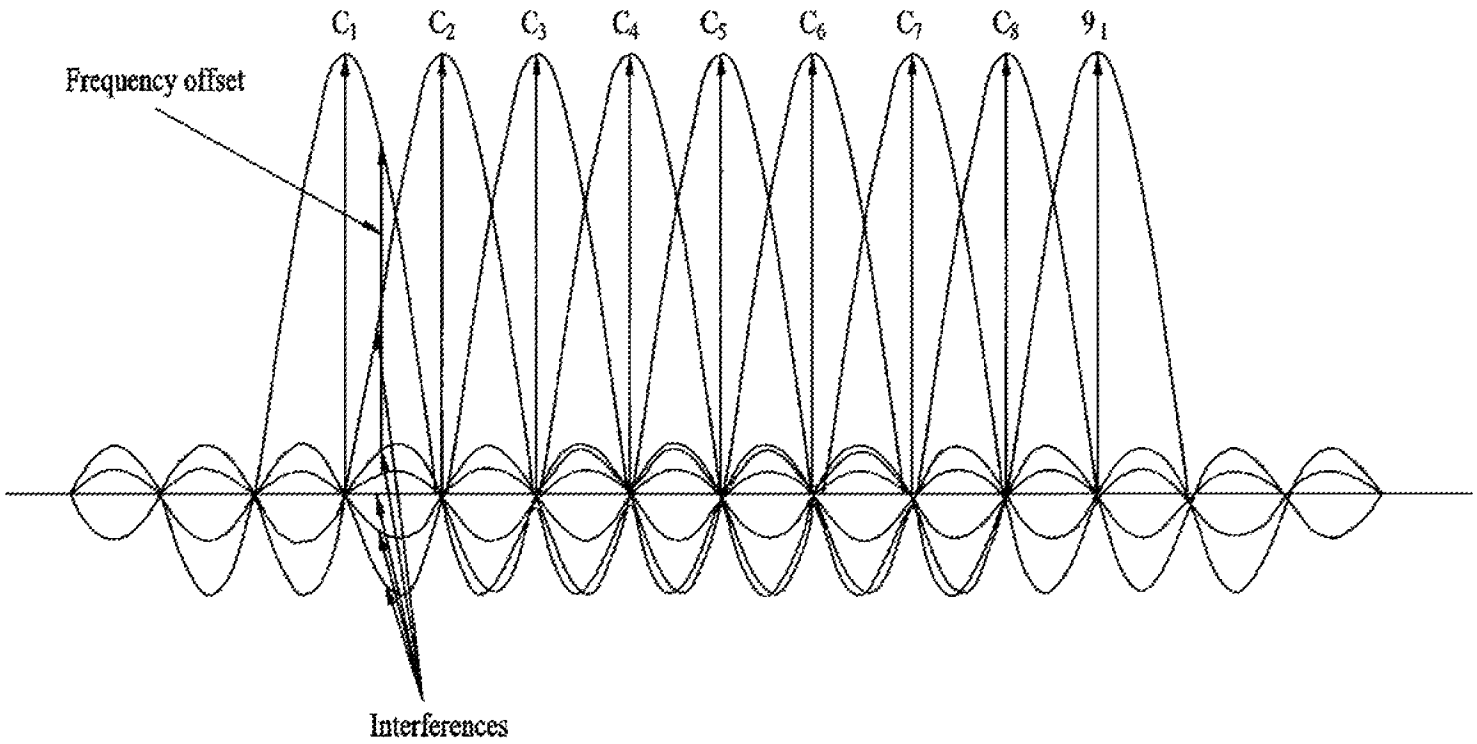
FIG. 1 is a conceptual diagram illustrating the influence of a frequency offset caused by a pulse shaping in a frequency domain when a sequence is mapped to a sub-carrier according to the present invention.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

The present invention provides a cyclic shift (CS) setup method to provide against the frequency offset, so that it can easily prevent a sequence (i.e., CAZAC sequence) performance from being deteriorated. For this purpose, the present invention will disclose the method for applying the cyclic shift to the CAZAC sequence, and the influence of the frequency offset of the CAZAC sequence.

The cyclic shift may be applied to the CAZAC sequence according to two schemes, i.e., a first scheme for performing the cyclic shift on the sequence, and a method for multiplying an exponential function of other areas by a time- or frequency-domain sequence, and performing the cyclic shift on the multiplied result.

The cyclic shift "d" is applied to the frequency index "k" in the frequency domain. If the sequence index of M and the N-length sequence is represented by c(k; d, M, N), a method for performing the cyclic shift on the sequence can be represented by the following equation 2:

$$C(k;d,M,N)=c(\mathrm{mod}(k-d,N);M,N) \quad \text{[Equation 2]}$$

Where "d" is indicative of an amount of the cyclic shift, and "mod" is indicative of a modular operator.

A method for applying the cyclic shift by multiplying an exponential function by the sequence can be represented by the following equation 3:

$$c(k; d, M, N) = f(\mathrm{mod}(k-d, N); M, N) = \exp\left(\frac{j2\pi dk}{N}\right)\mathrm{FFT}(c(k; d, M, N)) \quad \text{[Equation 3]}$$

In the meantime, although each of the above Equations 2 and 3 shows an exemplary cyclic shift applied in the frequency domain, the cyclic shift may be applied in the time-domain sequence sampling index "n" in the time domain. In this case, an application example of the cyclic shift can be represented by the following equation 4:

$$x_{u,v}(n)=x_u((n+C_v)\mathrm{mod}\ N_{ZC}) \quad \text{[Equation 4]}$$

where "$C_v$" is indicative of the degree of the cyclic shift, "n" is indicative of a sampling index, "$N_{ZC}$" is indicative of the ZC-sequence length, and "u" is indicative of an root index of the ZC sequence.

The CAZAC sequences can be distinguished from each other under the condition that different root indexes are used, however, it should be noted that a difference in cross-correlation occurs among the CAZAC sequences.

However, in the case of at least two CAZAC sequences associated with the cyclic shift, the cross-correlation value between the CAZAC sequences is zero, so that the above-mentioned CAZAC sequences are used when a high rejection ratio is required for the two CAZAC sequences.

Specifically, the CAZAC sequence associated with the cyclic shift share the time-frequency resources within the same cell, so that they can be used to discriminate among different signals/UEs during the transmission of data/control signals.

However, if the frequency offset occurs in the frequency domain in the same manner as in the case in which the CAZAC sequence is transmitted using the OFDM scheme, the present invention may encounter the excessive deterioration of a performance and false alarm rate.

The following description will disclose an example in which the sequence is transmitted in the frequency domain, and another example in which the sequence is transmitted using the OFDM scheme.

FIG. 1 is a conceptual diagram illustrating the influence of a frequency offset caused by a pulse shaping in a frequency domain when a sequence is mapped to a sub-carrier according to the present invention.

As shown in FIG. 1, each of sequence samples is mapped to the sub-carrier. If a reception end performs the signal sampling due to the frequency offset as denoted by the location of "Interference", signals of neighboring sub-carriers are mixed within a single sample. In other words, if the pulse-shaping function is p(x), the response of an arbitrary sub-carrier can be represented by the following equation 5:

$$r(k, f_{off}) = \sum_{n=0}^{N-1} p(kw_0 - nw_0 + f_{off})c(n) \quad \text{[Equation 5]}$$

where "$r(k, f_{off})$" is indicative of a reception (Rx)-frequency response at the k-th sub-carrier location if the frequency offset is $f_{off}$, "c(n)" is indicative of a CAZAC sequence mapped to the sub-carrier by the user equipment (UE), "p(f)" is indicative of a pulse-shaping function in a frequency domain, and $\omega_o$ is indicative of a sub-carrier spacing.

In the case of $f_{off}=0$, the above Equation 5 outputs only the value c(k). Otherwise, in the case of $f_{off}\neq 0$, the signal of the neighboring sub-carrier may enter the reception end, so that there arises a performance deterioration. Due to the performance deterioration caused by the frequency offset, the probability of encountering the detection error in the reception end increases, and the false alarm rate and/or miss-detection may unavoidably increase in the reception end.

Specifically, provided that the cyclic shift is applied in the time domain and the CAZAC sequence is transmitted within the frequency domain, one may not discriminate among various sequences. And, the above-mentioned problem may occur in a situation, even when the CAZAC sequence is transmitted within the time domain as a form of the timing offset.

In other words, if the frequency offset or the timing offset occurs, methods for employing the cyclic shift must unavoidably experience the performance deterioration. Also, the influence of the frequency offset is equally applied to a specific case in which the cyclic shift is applied in the time domain as denoted by Equation 4.

Therefore, there must be newly developed a technology for preventing a performance of the sequence (i.e., CAZAC sequence) from being deteriorated under the condition that the frequency offset occurs.

Specifically, in the case of applying the cyclic shift to the CAZAC sequence, the frequency offset or the timing offset excessively occurs, so that the present invention has difficulty in discriminating among sequences when the frequency- or timing-offset occupies at least the half of a single sub-carrier spacing.

However, the degree of the frequency offset and the degree of the Doppler shift may be different in individual cells of a cellular mobile communication system.

Therefore, according to one embodiment, the present invention provides different cyclic shift (CS) setup methods according to the degree of frequency offsets of the individual cells, and a detailed description thereof will hereinafter be described.

Figure 2:
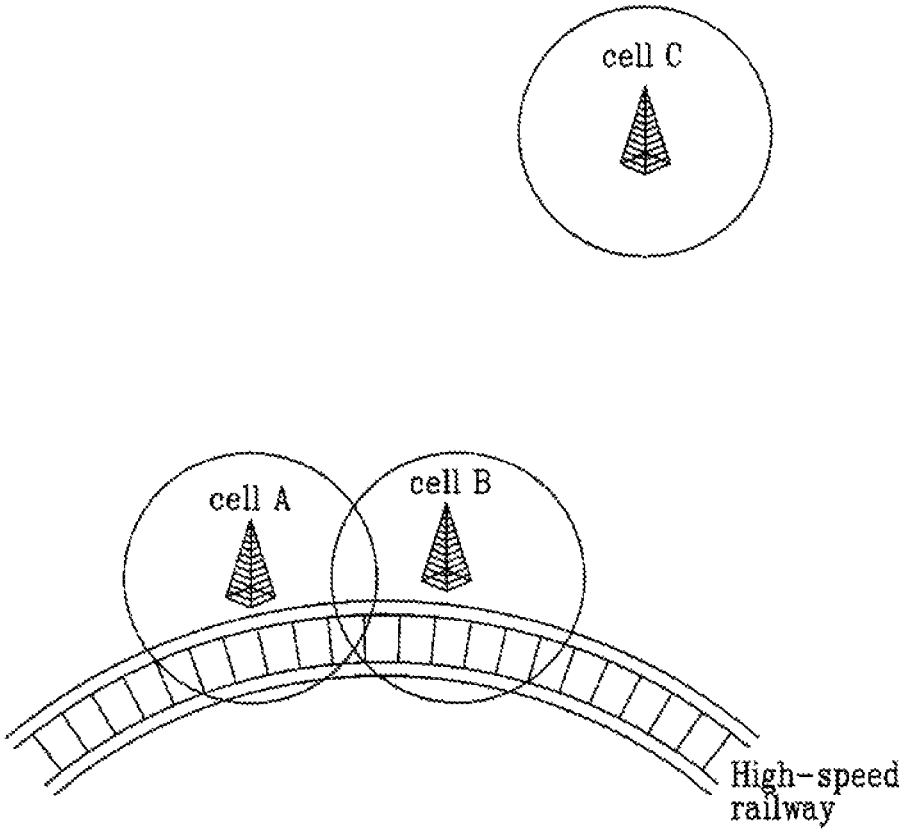
FIG. 2 is a conceptual diagram illustrating different frequency offset situations existing in a plurality of cells according to the present invention.

FIG. 2 is a conceptual diagram illustrating different frequency offset situations existing in a plurality of cells according to the present invention.

Referring to FIG. 2, the present invention may determine that a specific cell having many high-mobility UEs in a cellular mobile communication system including many cells has a high frequency offset. There is every probability that a UE contained in a cell including residential districts may be a low-speed UE, so that the frequency offset within the cell may be low.

In more detail, FIG. 2 shows cells A and B adjacent to a high-speed railway, and the cell C distant from the high-speed railway.

In the case of the cells A and B adjacent to the high-speed railway, there is every probability that a plurality of high-speed UEs are contained in a corresponding cell, so that the present invention has an advantage in that a sequence which is very resistant to the frequency offset may be allocated.

For example, in the case of the cell C adjacent to the residential district distant from the high-speed railway, the probability of including the high-speed UE in a corresponding cell is relatively low, so that there is no need to allocate only the sequence which is very resistant to the frequency offset.

In the case of the available sequence (e.g., the CAZAC sequence), first sequences caused by the root indexes of the individual sequences and second sequences caused by the cyclic shift applied to the first sequences may have different frequency offset characteristics.

Therefore, the present invention establishes the restricted case and the unrestricted case, and provides the cyclic shift setup methods for the individual cases.

The restricted case indicates that the influence of the Doppler shift is higher than a predetermined threshold value so that an unexpected limitation occurs in the process for establishing a cyclic shift (CS)-applying interval.

The unrestricted case indicates that the influence of the Doppler shift is equal to or less than the predetermined threshold value, so that there is no limitation in the process for establishing the CS-applying interval.

The method for establishing the cyclic shift will hereinafter be described in detail.

Figure 3:
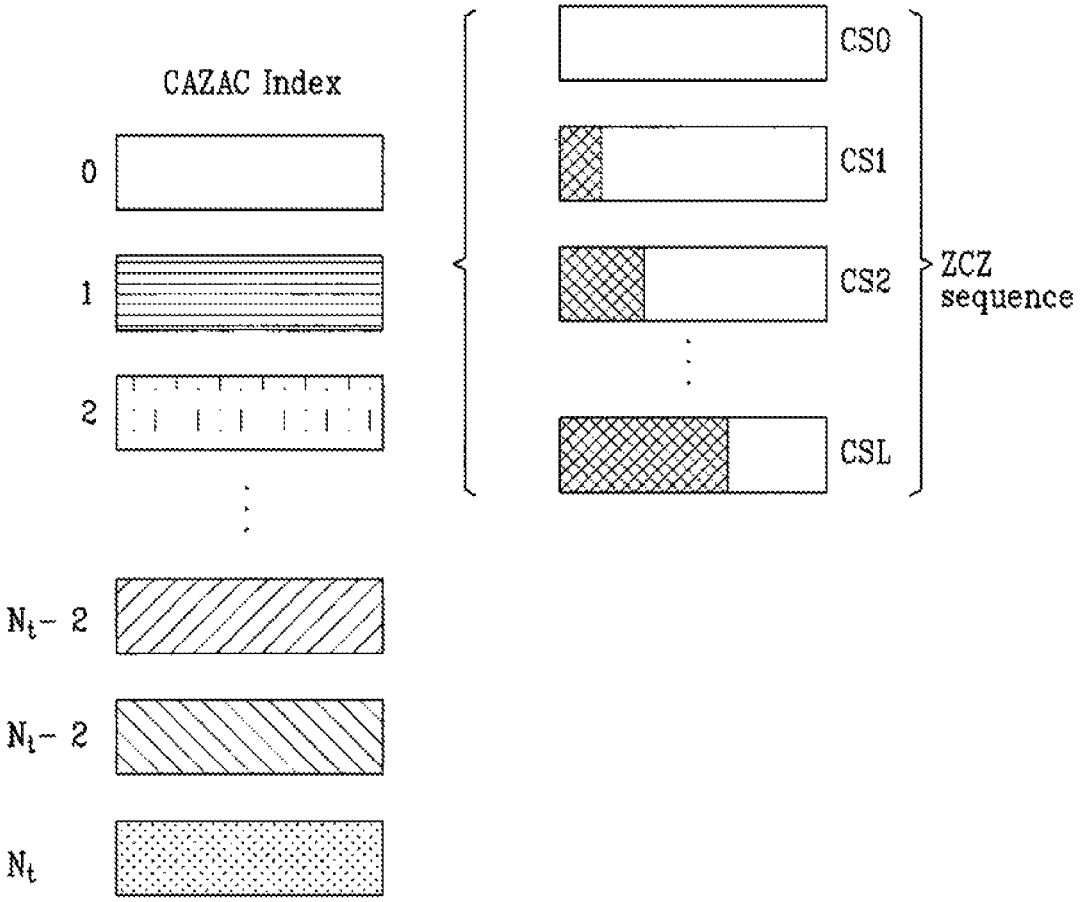
FIG. 3 is a conceptual diagram illustrating a sequence allocation method when a sequence is a CAZAC sequence according to the present invention.

FIG. 3 is a conceptual diagram illustrating a sequence allocation method when a sequence is a CAZAC sequence according to the present invention.

The CAZAC sequence may include a root sequence of each root CAZAC sequence and a Zero Correlation Zone (ZCZ) sequence to which different cyclic shifts (also called circular shifts) are applied.

In more detail, FIG. 3 shows the root sequence for each root index in Nt root indexes, and the ZCZ-sequence set to which L cyclic shifts are applied to each root sequence.

In this case, the ZCZ is indicative of a cyclic shift-applying interval to which the cyclic shift (CS) is applied, so that the Node-B is able to discriminate among RACH signals.

In the meantime, if the CAZAC sequence is used when the frequency offset exists, the present invention may have difficulty in discriminating among ZCZ sequences by the frequency offset. Therefore, the present invention may determine that the ZCZ sequence is not used in a predetermined cell having a frequency offset of more than a predetermined level.

In this way, the threshold value used to decide the degree of the frequency offset of each cell may be properly decided according to the number of available sequences of a corresponding system and the frequency offset degree of each cell.

If it is determined that the cell has the frequency offset of more than the predetermined level, the probability of containing the high-speed UE in this cell is very high as shown in the cell A or B.

However, if it is determined that the ZCZ sequence is not used in the cell having the frequency offset of more than the predetermined level, there may be only Nt indexes based on the CAZAC indexes, so that the number of available sequences becomes lower.

If a sequence re-use coefficient becomes lower, one must allocate sequences according to the cell planning. However, this allocation based on the cell planning may unexpectedly increase the complexity in the process for allocating the sequences to individual cells, so that another solution may be additionally required on the condition that the number of available sequences encounters the problem.

Furthermore, in case of using only Nt sequences and not using the ZCZ sequence, there may be a problem in estimating round trip delay or one-way trip delay while the performance of detecting sequence is enhanced. That is, there may be a problem of distinguishing the position of correlation peak varying due to the round trip delay or one-way trip delay, and a position of correlation peak varying due to the frequency offset. So, another solution may be additionally required against this problem.

In the meantime, the above-mentioned problem having difficulty in discriminating among ZCZ sequences due to the frequency offset becomes intensified on the condition that the CAZAC index is very high or is not very low.

In more detail, provided that "k" is indicative of a frequency-domain index, "N" is indicative of the CAZAC-sequence length, "M" is indicative of a CAZAC sequence, and a transmission (Tx) signal is indicative of "c(k,N,M)", a reception (Rx) signal can be represented by the following equation 6:

$$R(k, N, M) = c(K, N, M) \cdot \exp\left(-\frac{2\pi M \cdot d}{N} \cdot k\right) \quad \text{[Equation 6]}$$

where "d" is indicative of the amount of a frequency-domain delay caused by the frequency offset.

As can be seen from Equation 6, if the CAZAC index "M" has a very low value, or if the CAZAC index "M" has the highest value from among a total of Nt sequence indexes, the influence of the exponential function caused by the frequency offset is gradually reduced, so that the influence of the frequency offset in the Rx signal is gradually reduced.

If the CAZAC sequence is allocated to the cell having the frequency offset of more than the predetermined level, the present invention may allocate only the root sequence. In the case of using the ZCZ CAZAC sequence due to the insufficient number of root sequences, the present invention may allow the CAZAC sequence to employ a specific sequence which is in an initial predetermined range or the last predetermined range from among total indexes. In this case, it should be noted that the term "predetermined range" can be established in different ways according to system detection performances.

In the case of comparing the above-mentioned method with the other method for allowing the ZCZ sequence not to be used in the cell having the high frequency offset, the above-mentioned method increases categories or types of available sequences, so that there is almost no need to perform the cell planning.

In more detail, if the number of total CAZAC sequences is Nt as shown in FIG. 3, the sequence to be used in the cell of the high frequency offset may be set to CAZAC indexes 0, 1, 2, Nt-2, Nt-1, and Nt.

In the meantime, in the case of using the CAZAC sequence for the cell having the frequency offset of more than the predetermined level, there is no need to use only indexes other than the above-mentioned CAZAC indexes 0, 1, 2, Nt-1, Nt-2, and Nt. In order to reduce the interference between the aforementioned CAZAC sequence and the other sequence used for the cell having the high frequency offset, the present invention may not use the sequence index sued for the cell having the high frequency offset as necessary, resulting in the implementation of high efficiency.

In the meantime, in the case of using the ZCZ sequence to guarantee the number of available sequences in the cell having the high frequency offset and/or to guarantee the performance of estimating the time delay occurred in the channel, the present invention establishes the cyclic shift interval in the restricted case in consideration of the alias (i.e., Doppler shift) caused by the frequency offset. As a result, the present invention prevents the performance deterioration caused by the frequency offset, and a detailed description thereof will hereinafter be described.

If the presence of the frequency offset is decided, the frequency response of the Rx signal can be represented by the above Equation 6.

In the meantime, Equation 6 shows that a signal value is transferred from all the neighboring sub-carriers due to the frequency offset. However, indeed, a specific component greatly affecting the channel response of the Rx signal may be set to a part located at both sides of a corresponding sub-carrier, wherein the part receives a signal of the neighboring sub-carrier.

Therefore, in the case of considering only the first order case, Equation 6 may be represented by three terms, as shown in the following equation 7:

$$r(k,f_{off})=p(-f_0-f_{off})c(k-1)+p(-f_{off})c(k)+p(f-f_{off})c(k+1) \quad \text{[Equation 7]}$$

In the meantime, the reception end applies a conjugate complex number c(n) to the Rx signal, so that the applying result can be represented by the following equation 8:

$$r(k, f_{off})c^*(k) = \alpha_0 + \alpha_{-1}\exp\left(-\frac{j2\pi Mk}{N}\right) + \alpha_1\exp\left(\frac{j2\pi M(k+1)}{N}\right) \quad \text{[Equation 8]}$$

The pulse-shaping function of Equation 7 can be easily denoted by a raised cosine- or sin c-function.

For the convenience of description, the pulse-shaping function is represented by constants $\alpha_0$, $\alpha_{-1}$, and $\alpha_1$.

With reference to Equation 8, the channel response of the Rx signal occurs at three points, i.e., "t" indicative of a target position in the time domain, "t−M" indicative of a position shifted to the left side, and "t+M" indicative of a position shifted to the right side. It can be recognized that the channel response generated at the M-shifted position on the basis of the right/left sides corresponds to the alias of the Rx signal, i.e., the Doppler shift component having the 1-subcarrier spacing.

Figure 4:
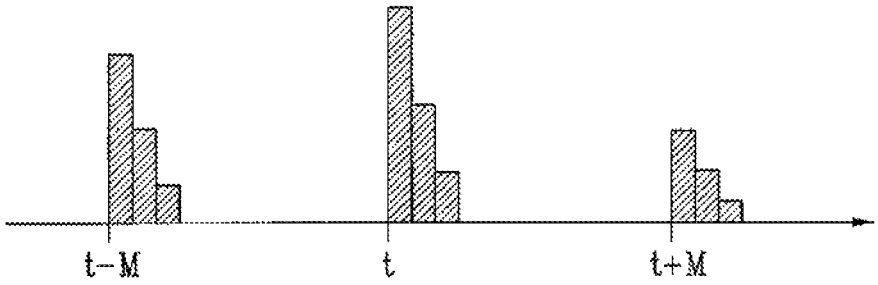
FIG. 4 is a conceptual diagram illustrating aliases which occur in a time-domain channel response of a reception sequence due to the frequency offset according to the present invention.

The above-mentioned phenomenon in which the alias occurs in the channel response due to the frequency offset is shown in FIG. 4.

FIG. 4 is a conceptual diagram illustrating aliases which occur in a time-domain channel response of a reception sequence due to the frequency offset according to the present invention.

If the cyclic shift is applied to a sequence used in a specific cell having a frequency offset of more than a predetermined level, a single channel response occurs at the target position in the Rx-channel response of the corresponding sequence, and two additional aliases may occur in the Rx-channel response of the corresponding sequence according to the 1-subcarrier-spacing-sized Doppler shift.

Therefore, if the CS-applying interval is established irrespective of the target position and the alias positions, an unexpected overlapping occurs between the channel response and the alias of the Rx sequence due to the channel delay spreading and the propagation delay, so that the confusion between the target position and the alias position may occur among different CS-applying sequences.

Accordingly, if the restricted case is decided when the CS-applying interval is established in the CAZAC sequence, the present invention considers the alias generated in the channel response, so that it establishes the CS-applying interval during a specific period in which the channel response of the Rx sequence does not overlap with the alias of the above channel response.

FIG. 4 shows an exemplary case in which the M-sized (where M=sequence index) alias occurs when CAZAC sequence is generated in a frequency domain. However, if the CAZAC sequence is generated in the time domain, the alias generation position caused by the Doppler shift of the 1-subcarrier spacing may be determined in different ways.

All the CS-applying cases used for the individual domains will hereinafter be described in detail.

For the convenience of description and better understanding of the present invention, FIGS. 5-11 assume that the cyclic shift unit is set to $T_0$.

Figure 5:
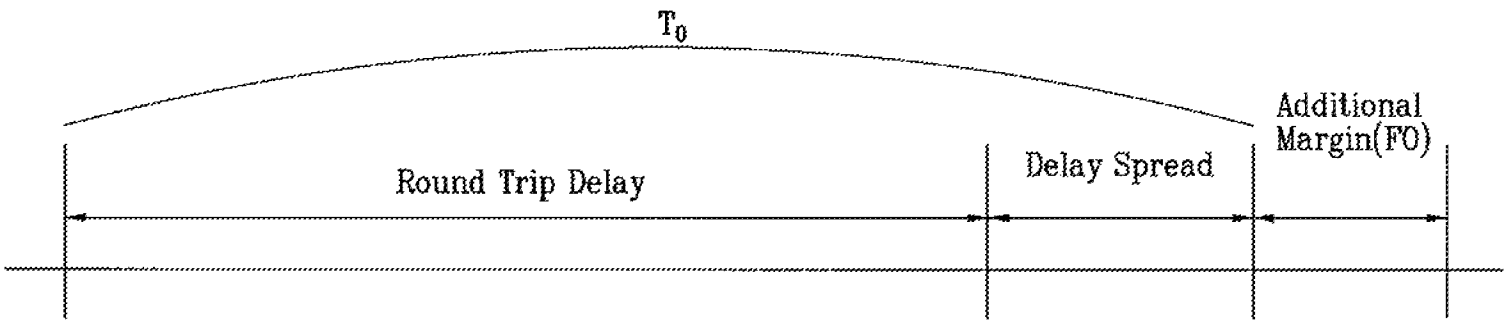
FIG. 5 is a conceptual diagram illustrating a method for establishing a new cyclic shift (CS)-applying unit by adding an additional margin to an old CS-applying unit according to the present invention.

FIG. 5 is a conceptual diagram illustrating a method for establishing a new cyclic shift (CS)-applying unit by adding an additional margin to an old CS-applying unit according to the present invention.

The present invention generates a cyclic-shifted preamble according to the design based on the RACH component. However, under the environment in which the OFDM frequency offset exists, the reception end of the present invention may easily mistake a normal sequence for another sequence.

In order to prevent the above-mentioned problem from being generated, the present invention may use an additional cyclic shift margin as shown in FIG. 5.

Referring to FIG. 5, the delay spread is indicative of a channel delay spread, and the round trip delay (RTD) is indicative of a propagation proceeding time of a physical distance between the user equipment (UE) and the Node-B. In the case of using the additional cyclic shift margin, the present invention adjusts the margin size for each sequence, so that it can reduce the influence of the frequency offset when the sequence is used.

In the case of implementing the frequency offset using the additional margin, the cyclic shift unit is decided by the function of the CAZAC sequence. In other words, in association with the CAZAC sequence "M", the cyclic shift unit is represented by the following equation 9:

$$T(M)=T_0+T_{margin}(M) \quad \text{[Equation 9]}$$

where $T_0$ is indicative of a common cyclic shift unit irrespective of the sequence index, and $T_{margin}$ (M) is indicative of an additional margin used when the sequence index is M. This margin can be decided by other methods according to usages of the sequence and the cyclic shift.

Therefore, although it is preferable that the cyclic shift unit is at least 2M, this additional margin may be changed to another margin according to the CS-applying area. The above-mentioned situation is shown in FIGS. 6 and 7.

Figure 6:
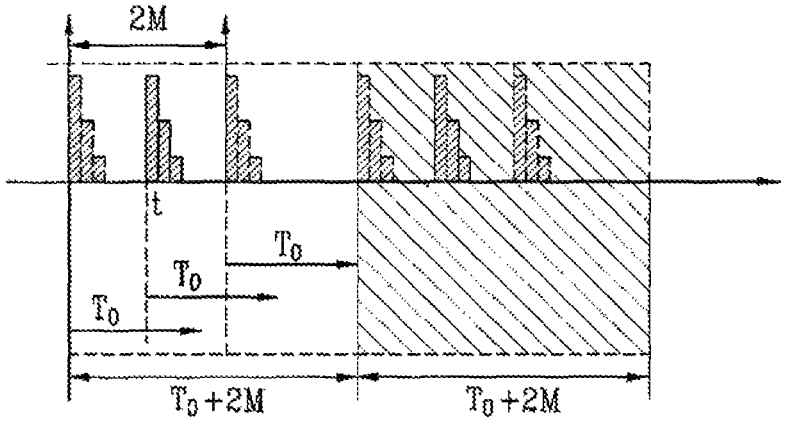
FIGS. 6 and 7 are conceptual diagrams illustrating application examples of the additional margin of FIG. 5 under the condition that a sequence index is low according to the present invention.
Figure 7:
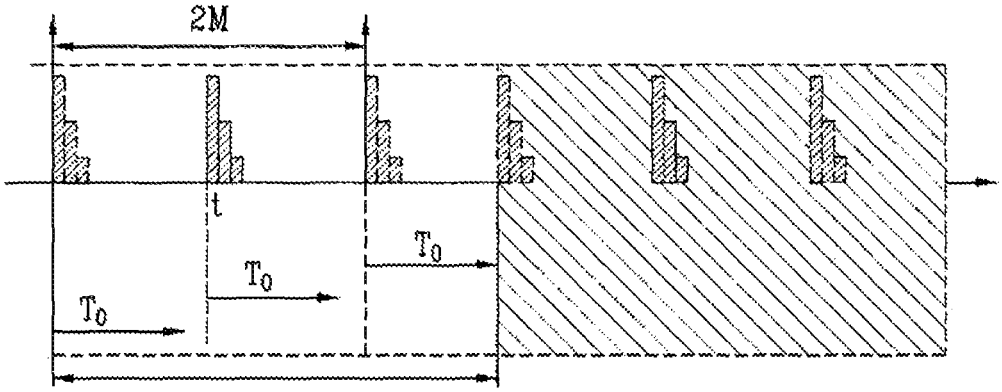

FIGS. 6 and 7 are conceptual diagrams illustrating application examples of the additional margin of FIG. 5 under the condition that a sequence index is low according to the present invention.

Here, in case of FIG. 6, the interval of M due to the frequency offset is smaller than the cyclic shift interval of $T_0$. Even when using this range, we can avoid the overlapping problem with other sequences. However, there may be a problem of estimating the information for the time delay of the transmitted sequence. So, in one embodiment of this invention, it is preferable not using this range where the interval of M due to the frequency offset is smaller than the cyclic shift interval of $T_0$. But, there may be a system using this range according to the requirement of the system.

The oblique-lined part of FIGS. 6 and 7 indicates the cyclic shift opportunity.

If the signal having no influence of the frequency offset is located at "t", the pulse affected by the frequency offset may occur at a single point of the left side, and may occur at a single point of the right side. If the signal includes $T_0$ used as a basic cyclic shift unit, $T_{margin}(M)$ may be set to 2M.

The additional margin is applied to all the indexes, so that the present invention may define the cyclic shift highly resistant to the frequency/timing offsets.

However, the higher the sequence index, the higher the value of $T_{margin}(M)$. As a result, the number of available cyclic shifts is reduced to "1". In order to prevent the reduction of the cyclic shifts, the present invention will disclose the case of the high CAZAC index in detail.

Figure 8:
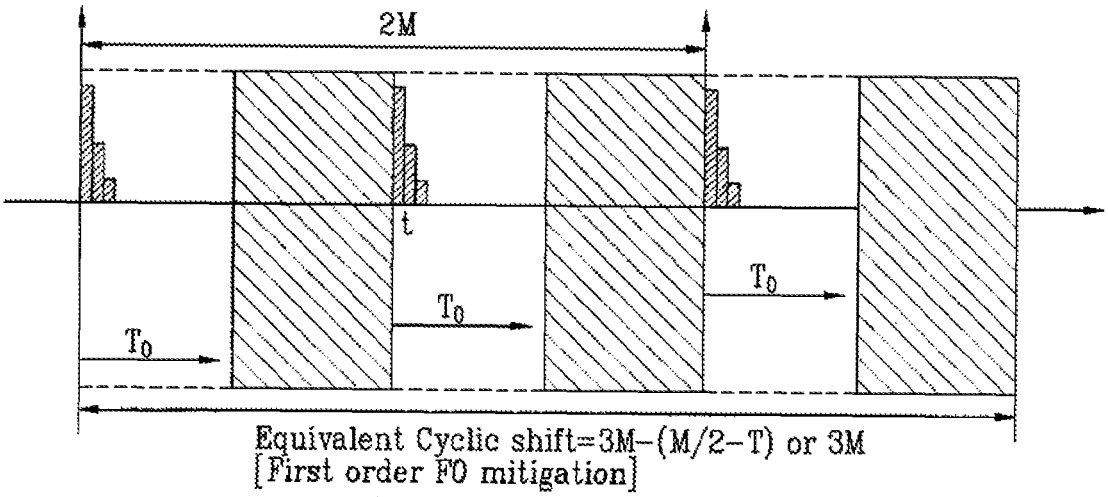
FIGS. 8 and 9 are conceptual diagram illustrating exemplary additional margins of FIG. 5 under the condition that a sequence index is high according to the present invention.
Figure 9:
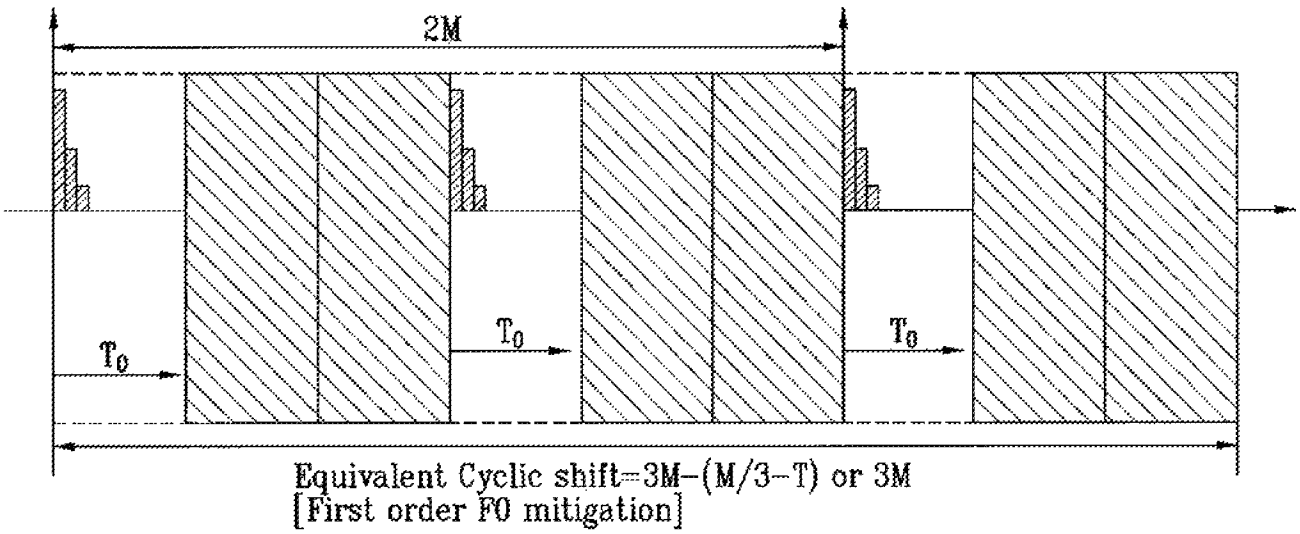

FIGS. 8 and 9 are conceptual diagram illustrating exemplary additional margins of FIG. 5 under the condition that a sequence index is high according to the present invention.

FIG. 8 shows the case in which the CAZAC index "M" is $2T_0$~$3T_0$, and FIG. 9 shows the case in which the CAZAC index "M" is $3T_0$~$4T_0$. Although the case of FIG. 8 considers the basic cyclic shift unit, the cyclic shift set denoted by the oblique-lined part may be additionally inserted in the intermediate space. The case of FIG. 9 has a wider space, so that at least two cyclic shifts can be inserted into this wider space.

Figure 10:
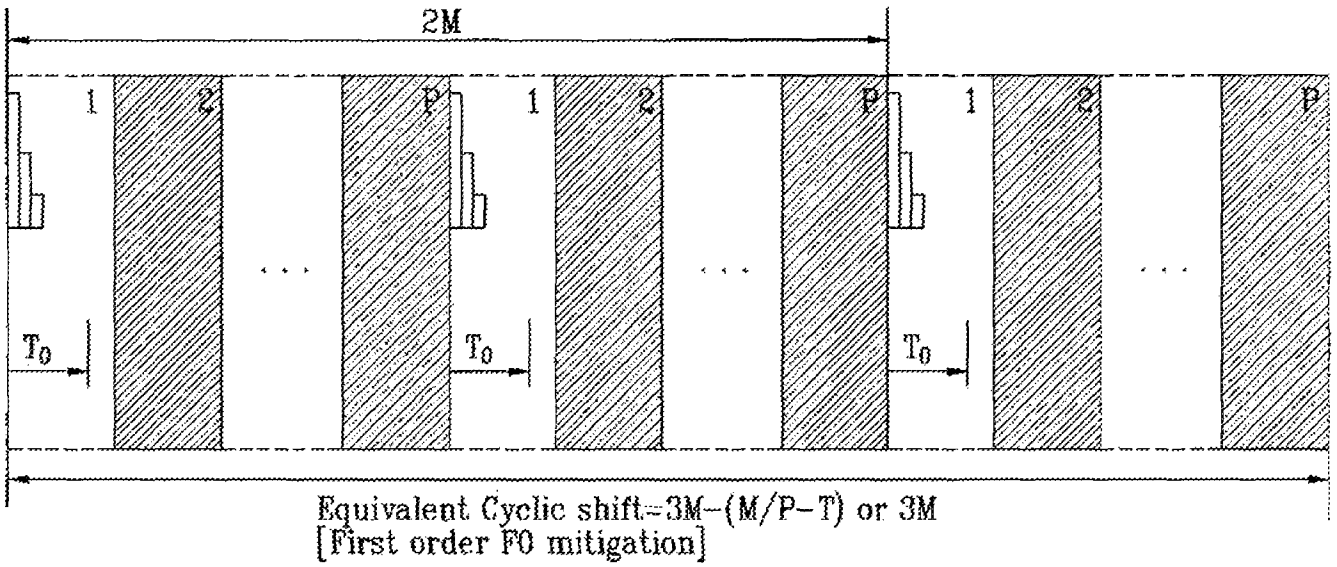
FIG. 10 shows an example of a single group composed of P cyclic-shift-sets according to the present invention.

FIG. 10 shows an example of a single group composed of P cyclic-shift sets according to the present invention.

Referring to FIG. 10, if the above-mentioned explanation is generalized, slots denoted by the oblique-lined parts are defined in the 3M range in which the block is constructed by pulses, and the M range is $PT_0$~$(P+1)T_0$, it can be recognized that P cyclic-shift-sets are constructed.

For the convenience of description, the 3M or $2M+PT_0$ unit will hereinafter be referred to as a cyclic shift group. A specific sequence to which the cyclic shift is applied includes a predetermined number of cyclic shift groups. The predetermined number of cyclic shifts can be applied to each cyclic shift group, so that the predetermined number of cyclic shifts can be applied to the cyclic shift component caused by the Doppler shift.

Figure 11:
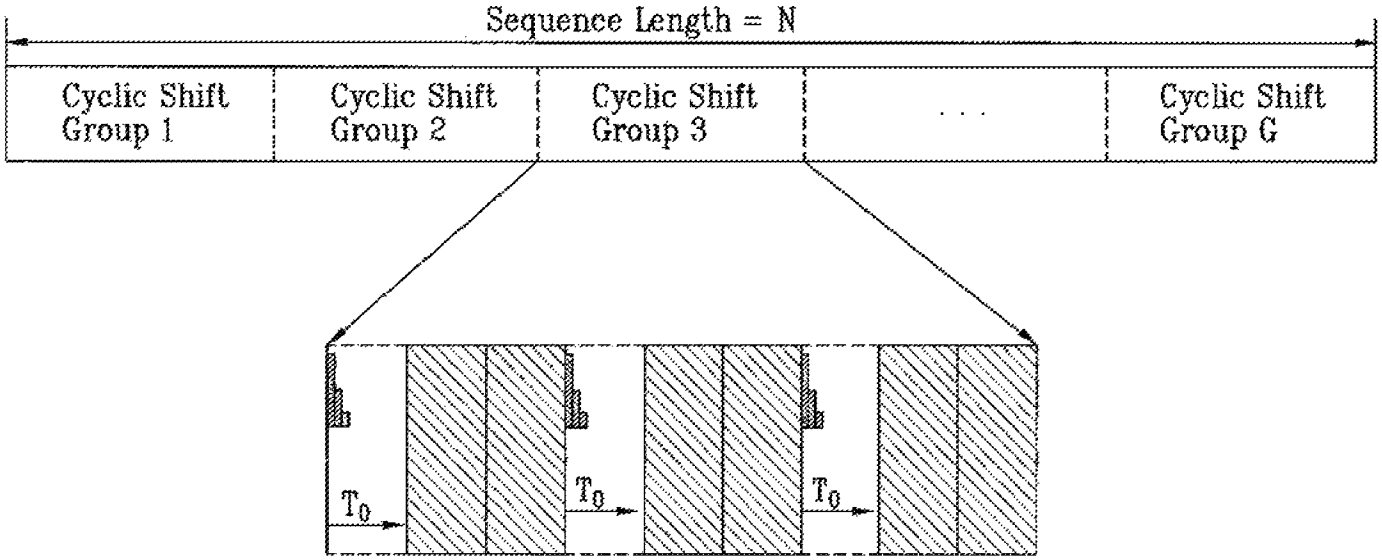
FIG. 11 is a conceptual diagram illustrating a method for establishing a cyclic shift (CS)-applying group and the CS-applying interval of each group according to the present invention.

FIG. 11 is a conceptual diagram illustrating a method for establishing a cyclic shift (CS)-applying group and the CS-applying interval of each group according to the present invention.

Referring to FIG. 11, units of cyclic shift groups can be defined in total sequences, and each cyclic shift group can be defined as shown in FIG. 10. Provided that the number of cyclic shift groups is G and the number of cyclic shifts for each group is P, the total number of available cyclic shifts is P*G. As shown in FIG. 11, according to one embodiment of the present invention, it is assumed that the sequence is divided into groups, and each group searches for a restricted available cyclic shift in each group.

In the case of using the above-mentioned scheme, all the available cyclic shifts are defined in the index range in which the number of cyclic shift groups is "1". If the sequence length is N, this range having the sequence length of N corresponds to indexes ranging from 1~N/3 to 2N/3~N−1. In this case, the k-th index has the same cyclic shift group as that of the (N-k)-th index and the cyclic shift set.

Figure 12:
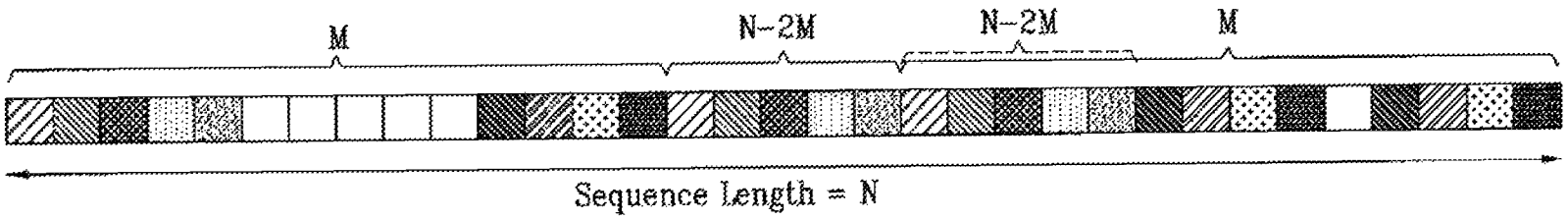
FIG. 12 shows locations at which pulses occur by an interference when the CAZAC index is contained in the interval of N/3~N/2 according to the present invention.

FIG. 12 shows locations at which pulses occur by an interference when the CAZAC index is contained in the interval of N/3~N/2 according to the present invention.

A single square of FIG. 12 indicates the cyclic shift unit. If the CAZAC index is higher than "N/3", all the consecutive cyclic shift positions (i.e., the cyclic shift positions defined by $T_0$) cannot be used, and they can be used according to predetermined rules.

A method for establishing the restricted cyclic shift set according to one embodiment of the present invention will hereinafter be described.

Figure 13:
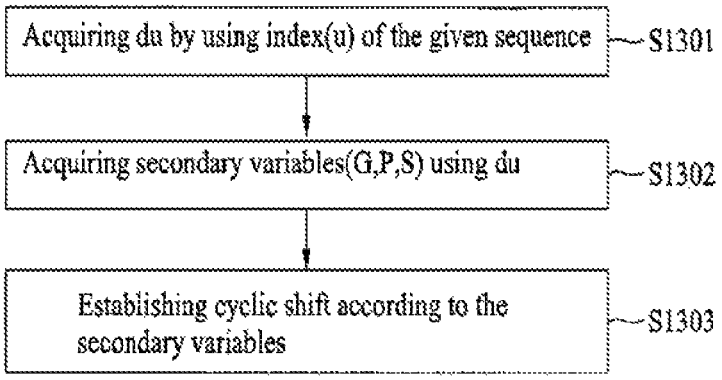
FIG. 13 is a flow chart illustrating a restricted cyclic shift set according to one embodiment of the present invention.

FIG. 13 is a flow chart illustrating a restricted cyclic shift set according to one embodiment of the present invention.

Referring to FIG. 13, if the restricted cyclic shift set is established in a cell having the frequency offset of more than a predetermined threshold value, the present invention provides a method for establishing the cyclic shift in consideration of the aliasing, so that there is no confusion between a desired channel response and this aliasing.

For this purpose, as shown in step S1301 of FIG. 13, the present invention provides a distance "$d_u$" between the response generated by the Doppler shift and a desired channel response using a given sequence root index "u". In this case, the above distance corresponds to the cyclic shift generated by the Doppler shift corresponding to the 1-subcarrier spacing.

A detailed description of the variable "$d_u$" will hereinafter be described in detail.

Figure 14:
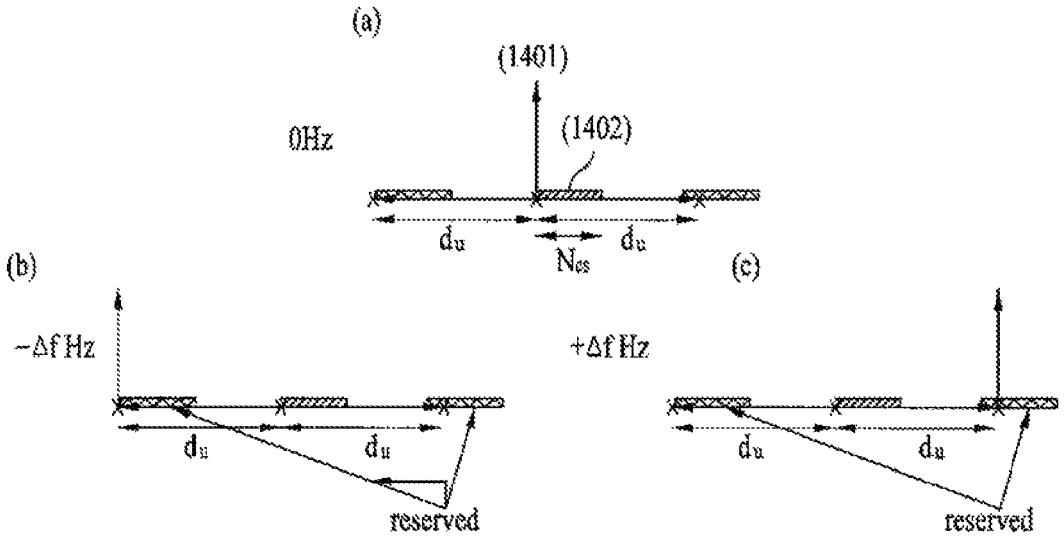
FIG. 14 is a conceptual diagram illustrating a method for establishing a variable ($d_u$) of a cyclic shift corresponding to the Doppler shift associated with the 1 sub-carrier spacing when the restricted cyclic shift set is established according to the present invention.

FIG. 14 is a conceptual diagram illustrating a method for establishing a variable ($d_u$) of a cyclic shift corresponding to the Doppler shift associated with the 1-subcarrier spacing when the restricted cyclic shift set is established according to the present invention.

Referring to FIG. 14(a), if there is no influence of the Doppler frequency, the peak position generated by the correlation operation of the reception end is denoted by "1401". By the delay spread and the round trip delay (RTD), the peak position at the reception end appears at the cyclic shift unit $N_{CS}$ (1402) used as the cyclic shift unit basically decided by the system.

In the meantime, in the case of the presence of the Doppler frequency corresponding to the 1-subcarrier spacing, the peak position caused by the correlation operation of the reception end is decided according to the sequence indexes.

According to the present invention, the distance between the peak position based on the Doppler shift corresponding to the 1-subcarrier spacing Δf and the ideal peak position is called "$d_u$".

In other words, FIG. 14(b) shows the shift of the reception-end channel response caused by the Doppler frequency −Δf. FIG. 14(c) shows the shift of the reception-end channel response caused by the Doppler frequency +Δf. Based on the above-mentioned fact, the value "$d_u$" may be considered to be the cyclic shift caused by the Doppler shift.

If the restricted cyclic shift is established in consideration of the cyclic shift corresponding to the Doppler shift of the 1-subcarrier spacing, the present invention controls the established restricted cyclic shift not to be overlapped with the channel response movement caused by the Doppler shift.

The present invention excludes the reserved areas "reserved" of FIGS. 14(a) and 14(b) from the established cyclic shift interval, so that it can prevent an unexpected confusion from being generated between channel responses although the relatively high Doppler shift has occurred.

Referring back to FIG. 13, the present invention acquires secondary variables using the acquired variable "$d_u$" of the above step S1301 at step S1302. Namely, the present invention acquires the number (G) of cyclic shift groups, the number (P) of cyclic shifts applicable to each group, and the length (S) of each group from current sequences (e.g., ZC sequences).

The above-mentioned secondary variables must be differently established according to sequence indexes, because the group length is changed to another according to the sequence indexes. And, the variable "$d_u$" is dependent on the sequence index, so that the present invention provides a method for establishing secondary variables according to the range of the variable "$d_u$".

Furthermore, the present invention may apply not only the above group-based cyclic shift but also an additional cyclic shift using a specific area which is not contained in the cyclic shift group within the sequence range, and a detailed description thereof will hereinafter be described.

Thereafter, at step S1303, the present invention establishes the cyclic shift using the acquired secondary variables of step S1302.

The mathematical relationship between detailed variables for the cyclic shift application will be described in detail.

The restricted cyclic shift according to the present invention has been proposed to prevent the high Doppler frequency effect from being generated.

The other cyclic shift offset "$C_{off}$" different from the "$d_u$" variable will hereinafter be described in detail.

The "$C_{off}$" value indicates the degree of an offset generated by the Doppler shift.

If the offset degree generated by the Doppler shift is less than the half of the given sequence range, this offset degree may have the same meaning as that of the $d_u$ variable. Otherwise, if the offset degree generated by the Doppler shift is equal to or higher than the half of the given sequence range, the resultant value acquired when the "$C_{off}$" value is subtracted from the total sequence length may correspond to the $d_o$ variable.

The "$C_{off}$" value is dependent on the root index of the used sequence. The preamble may be generated from either the time domain or the frequency domain. The relationship between "$C_{off}$" and "u" values is dependent on the domain generating the preamble.

If the ZC sequence is generated from the frequency domain, and the cyclic shift is applied in the time domain, the present invention may induce the "$C_{off}$" value using the following method, and a detailed description thereof will hereinafter be described.

It is assumed that the signal energy is propagated by the value transferred from the neighboring sub-carrier according to the Doppler frequency. And, it is assumed that the transferring from the neighboring carrier occurs at only the sub-carrier position spaced from a current sub-carrier by one blank, and this case is referred to as a first order case. In this case, the Rx signal at the specific sub-carrier is composed of three terms shown in the following equation 10:

$$s(n)=p(-f_{off})c(n)+p(-w_0-f_{off})c(n-1)+p(w_0-f_{off})c(n+1) \quad \text{[Equation 10]}$$

Where, the pulse-shaping function "p(f)" may be denoted by a raised cosine- or sin c-function. For the convenience of description, if constants $c_0$, $c_{-1}$, and $c_1$ are established, the s(n) value can be denoted by $s(n)=c_0c(n)+c_{-1}c(n-1)+c_1c(n+1)$. For the convenience of description, if the conjugate of the sequence is multiplied by the resultant value s(n), the following equation 11 can be acquired:

$$s(n)c^*(n)=c^*(n)(c_0c(n)+c_{-1}c(n-1)+c_1c(n+1))=c_0+c_{-1}c(n-1)c^*(n)+c_1c(n+1)c^*(n) \quad \text{[Equation 11]}$$

In Equation 11, if "c(n)=x(n)" is denoted by CAZAC, $c(n-1)c^*(n)$ can be represented by the following equation 12:

$$x^*(n-1)x(n)=\exp\left(-\frac{j2\pi un}{N_{ZC}}\right) \quad \text{[Equation 12]}$$

Here, "u" indicates the root index, and "Nzc" indicates the sequence length.

If Equation 12 is applied to Equation 11, it can be recognized that "s(n)" is composed of three signals. A first term of the "s(n)" value is indicative of a simple DC component, a second term is indicative of a complex exponential wave having the frequency of u/Nzc, and a third term is indicative of a complex exponential wave having the frequency of −u/Nzc.

Therefore, the "$C_{off}$" value can be represented by the following equation 13:

$$C_{off,u}=u \quad \text{[Equation 13]}$$

On the contrary, if the ZC sequence is generated from the time domain and the cyclic shift is generated from the time domain, the "$C_{off}$" value can be calculated by the following method.

If the RACH preamble received without having the frequency offset is set to r(n), the RACH signal received along with the frequency offset can be represented by the following equation 14:

$$\tilde{r}(n)=e^{jhwn}r(n) \quad \text{[Equation 14]}$$

Where Δω is denoted by $\Delta w=2\pi\Delta f/f_S$, and Δf indicates the frequency offset denoted by the hertz (Hz) unit, and $f_s$ is indicative of a sampling rate of the RACH preamble.

The auto-correlation of the $\tilde{r}(n)$ value can be calculated by the equation "$r(n)=x_u(n)$", wherein "u" is indicative of the index of the ZC sequence $$c_r(0)=\sum_{n=0}^{N_{ZC}-1}\tilde{r}(n)x_u^*(n)=\sum_{n=0}^{N_{ZC}-1}e^{j\Delta wn}=\sum_{n=0}^{N_{ZC}-1}e^{j2\pi(\Delta f/f_S)n} \quad \text{[Equation 15]}$$

In Equation 15, if "$C_{off,u}$" is indicative of the margin of a frequency offset, the auto-correlation of $\tilde{r}(n)$ can be calculated by $r(n)=x_u((n+c_{off,u})_{N_{ZC}})$ of the following equation 16:

$$c_r(0)=\sum_{n=0}^{N_{ZC}-1}\tilde{r}(n)z_v^*(n)=\sum_{n=0}^{N_{ZC}-1}e^{j2\pi\left((u\cdot c_{off,u})_{N_{ZC}}/N_{ZC}\right)n} \quad \text{[Equation 16]}$$

In Equation 16, "$(\ )_{N_{ZC}}$" is indicative of a modular operation of the "Nzc" value. If $C_{off,u}'=u*C_{off,u}$ is a root index related with the sampling shifts, and γ is indicative of a re-sampling ratio replying to the timing error, the $C_{off,u}'$ value can be denoted by $C_{off,u}'=(\gamma-1)N_{ZC}$.

By Equations 15 and 16, the γ value can be denoted by $\gamma=1+\Delta f/f_S$.

The channel response position is called a main lobe, and the alias response position of a channel affected by the (+/−) Doppler frequency is called a side lobe.

In more detail, the main lobe is indicative of the position caused by the 0 offset, and is equal to a normal channel response position when there is no influence of the Doppler frequency.

The positive(+) side lobe is indicative of the position caused by the positive(+) offset, and is equal to an alias response position affected by the positive (+) Doppler frequency. The negative(−) side lobe is indicative of the position caused by the negative(−) offset, and is equal to an alias response position affected by the negative(−) Doppler frequency.

As can be seen from Equation 16, it can be recognized that the main lobe of the auto-correlation peak occurs at $C_{off,u}=0$ or $C_{off,u}'=0$. By the above Equation 16, the pair of side-lobes occurs under the condition of the following equation 17:

$$(u*C_{off,u})_{Nzc}=-1 \quad \text{[Equation 17]}$$

Therefore, the result of "$u*C_{off,u}-m*Nzc$" is equal to "−1", as represented by "$C_{off,u}=(m*Nzc-1)/u$". In this case, "m" is indicative of the lowest integer capable of allowing the $C_{off,u}$ value to be an integer. For example, if the ZC-sequence length is 839 and the root index is 300, the "m" value is set to 59, and the $C_{off,u}$ value is set to 165.

In the case of using the ZC sequence in the time domain, the $C_{off}$ value can be defined by the following equation 18:

$$C_{off,u}=(N_{zc}m-1)/u \quad \text{[Equation 18]}$$

In Equation 18, "m" is indicative of the smallest positive number capable of allowing the $C_{off}$ value to be an integer, and "Nzc" is indicative of the ZC length, All the indexes "u" is a relative prime of the Nzc value. Therefore, the positive integer number ($u_{inv}=1/u$) capable of satisfying the equation ($u*u_{inv}=1$ mod Nzc) exists. Therefore, the $C_{off,u}$ value can be easily represented by the following equation 19:

$$c_{off,u}=\frac{m\cdot N_{ZC}}{u}-\frac{1}{u}=u^{-1}\text{mod}N_{ZC} \quad \text{[Equation 19]}$$

In Equation 19, a negative sign (−) is the opposite of the positive sign (+), so that it can be represented by the following equation 20:

$$C_{off,u}=(1/u)\text{mod } N_{zc} \quad \text{[Equation 20]}$$

In brief, if the CAZAC sequence is used in the frequency domain, the CAZAC-sequence index "u" becomes "$C_{off}$" without any change. If the CAZAC sequence is used in the time domain, the "(1/u) mod Nzc" is performed on the index "u" of the CAZAC sequence, so that the $C_{off}$ value can be acquired.

Provided that the ZC sequence is used in the frequency or time area, and the conjugate property between the $C_{off}$ and ZC sequences is used, the distance "$d_u$" between the main-lobe and the side-lobe can be represented by the following equation 21:

$$d_u=\begin{cases} c_{off,u}, & u\le N_{ZC}/2 \\ N_{ZC}-c_{off,u}, & u>N_{ZC}/2 \end{cases} \quad \text{[Equation 21]}$$

The present invention provides a variety of methods in establishing the restricted cyclic shifts, for example, a first method for establishing the restricted cyclic shift without using the fixed cyclic shift position, and a second method for establishing the restricted cyclic shift using the fixed cyclic shift position.

The first method is associated with the restricted cyclic shift without considering the pre-defined shift position. The second method is associated with the restricted cyclic shift with the consideration of the pre-defined shift position.

In regard to the first method, there are a variety of methods, i.e., a method for directly using the shift value of the $V_a$-th restricted cyclic shift, and a method for establishing the cyclic shift interval using the shift value "$C_{va}$". Namely, the cyclic-shifted sequence becomes $x_{u,V}(n)=x_u((n+C_{Va})\text{mod } N_{zc})$ as shown in Equation 4.

In regard to the first method, there are a variety of methods employing a decimal "$V_a$" for use in the cyclic shift, for example, a method for establishing the cyclic shift interval by calculating the shift-index decimal $V_a$.

In other words, if the length of the cyclic shift is set to Ncs, the cyclic-shifted index becomes "$x_{u,Va}(n)=x_u((n+\text{round}(v_aN_{cs}))\text{mod } N_{zc})$". In this case, "round" is indicative of a round-off function.

In regard to the second method, there are a variety of methods employing the integer "$V_a$" for use in the cyclic shift, for example, a method for establishing the cyclic shift interval by calculating the shift-index integer $V_a$. Namely, the cyclic-shifted sequence becomes $x_{u,Va}(n)=x_u((n+v_aN_{cs})\text{ mod } N_{zc})$.

In the meantime, if the cyclic shift is performed by the multiple of Ncs, random access preambles, each of which has the zero correlation zone (ZCZ) area having no correlation in the u-th root ZC sequence, are defined by $x_{u,v}(n)=x_u((n+vN_{cs})\text{ mod } N_{zc})$. This definition is appropriate for the low/middle cell having no problem in the high frequency offset. However, if the restricted cyclic shift is used in the high-mobility cell, the above-mentioned definition is inappropriate for the high-mobility cell. Specifically, the available "v" value is restricted, and the number of available ZCZ preambles is reduced to ⅓ of the ZCZ preambles of a general case.

Embodiments associated with the above-mentioned cases will hereinafter be described in detail.

Best Mode

This embodiment of the present invention will disclose a method for establishing the restricted cyclic shift using only the influence of the Doppler shift, without using the fixed cyclic shift position.

The present invention assumes that the preamble is generated using the ZC sequence used as the CAZAC sequence.

The "$d_u$" value of the following equation 22 shows a specific case in which the ZC sequence is generated in the frequency domain.

$$d_u=\begin{cases} u, & 0\le u<N_{ZC}/2 \\ N_{ZC}-u, & N_{ZC}/2\le u<N_{ZC} \end{cases} \quad \text{[Equation 22]}$$

In the case of generating the ZC sequence in the time domain, the "$d_u$" value can be represented by the following equation 23:

$$d_u=\begin{cases} (N_{ZC}\cdot m-1)/u, & 0\le(u^{-1}\text{mod}N_{ZC})<N_{ZC}/2 \\ N_{ZC}-(N_{ZC}\cdot m-1)/u, & N_{ZC}/2\le(u^{-1}\text{mod}N_{ZC})<N_{ZC} \end{cases} \quad \text{[Equation 23]}$$

In Equation 23, "m" is indicative of the smallest positive number capable of allowing the "$d_u$" value to be an integer, and Nzc is indicative of the ZC length. Equation 23 can also be represented by the following equation 24:

$$d_u = \begin{cases} u^{-1} \bmod N_{ZC}, & 0 \le (u^{-1} \bmod N_{ZC}) < N_{ZC}/2 \\ N_{ZC} - (u^{-1} \bmod N_{ZC}), & N_{ZC}/2 \le (u^{-1} \bmod N_{ZC}) < N_{ZC} \end{cases} \quad \text{[Equation 24]}$$

Therefore, the v-th cyclic shift of the u-th root index can be defined by $x_{u,v}(n)=x_u((n+C_v) \bmod N_{zc})$. In this case, if the general cyclic shift is decided, the $C_v$ value can be represented by $C_v=v*N_{cs}$. If the restricted cyclic shift is decided, the $C_v$ value can be represented by the following equation 25.

$$C_v = \begin{cases} v \cdot N_{CS},\ v = 0, 1, K, (\lfloor N_{ZC}/N_{CS} \rfloor - 1), & \text{for unrestricted sets} \\ S \cdot \lfloor v/P \rfloor + (v \bmod P) \cdot N_{CS},\ v = 0, 1, K, (P \cdot G + R - 1), & \text{for restricted sets} \end{cases} \quad \text{[Equation 25]}$$

If the restricted cyclic shift having no pre-defined shift position is decided, this case is considered to be a first case (Case 1), and a detailed description thereof will hereinafter be described.

The u-th root ZC sequence and the v-th random access preamble, each of which has the zero correlation area, are defined by "$x_{u,v}(n)=x_u((n+C_v) \bmod N_{zc})$".

In this case, "$C_v$" is denoted by the above equation 25.

In other words, in the case of the unrestricted sets having a small amount of the Doppler-shift influence, the present invention may establish the cyclic shift corresponding to an integer multiple of Ncs equal to the basic cyclic shift unit.

However, the case of the unrestricted sets less affected by the Doppler shift may establish the cyclic shift corresponding to the integer multiple of Ncs.

In association with FIG. 13, the case of the restricted sets greatly affected by the Doppler shift may establish the number (G) of cyclic shift groups, the number (P) of cyclic shifts applicable to each cyclic shift group, and the number (R) of additional cyclic shifts.

The method for calculating each secondary variable may be differently decided by the "$d_u$" range as previously stated in FIG. 13.

During the alias distance interval of $Ncs \le d_u < (Nzc/3)$, the number of cyclic shifts per group is denoted by $P=\lfloor d_u/N_{CS} \rfloor$, and there are $G(G=\lfloor N_{ZC}/S \rfloor)$ groups, each of which has the length $S=2 \cdot d_u+P \cdot N_{CS}$, and the number of restricted additional cyclic shifts is denoted by $R=\max(\lfloor (N_{ZC}-2 \cdot d_u-G \cdot S)/N_{CS} \rfloor,0)$.

During the alias distance interval of $(Nzc/3) \le d_u \le (Nzc-Ncs)/2$, the number of cyclic shifts per group is denoted by $P=\lfloor (N_{ZC}-2 \cdot d_u)/N_{CS} \rfloor$, and there are $G(G=\lfloor d_u/S \rfloor)$ groups, each of which has the length $S=N_{ZC}-2 \cdot d_u+P \cdot N_{CS}$, and the number of restricted additional cyclic shifts is denoted by $R=\min(\lfloor (d_u-G \cdot S)/N_{CZ} \rfloor,0),P)$.

The principles for calculating the above-mentioned secondary variables will hereinafter be described in detail.

(1) $d_u < N_{CS}$

Figure 15:
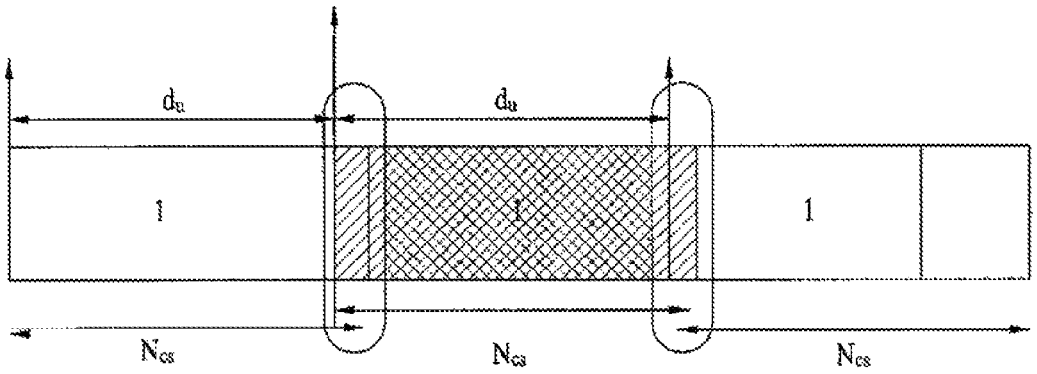
FIG. 15 is a conceptual diagram illustrating a specific case in which the variable ($d_u$) is less than a basic unit $N_{CS}$ to which the cyclic shift (CS) is applied according to the present invention.

FIG. 15 is a conceptual diagram illustrating a specific case in which the variable ($d_u$) is less than a basic unit $N_{CS}$ to which the cyclic shift (CS) is applied according to the present invention.

The cyclic shift unit ($N_{CS}$) is designed in consideration of the delay spread and the RTD which are capable of being generated in the channel. Therefore, if d, is less than $N_{cs}$, a peak caused by the delay spread and/or the RTD within the $N_{CS}$ range may overlap with the other peak caused by the Doppler shift, as shown in FIG. 15. Therefore, when establishing the restricted cyclic shift, this embodiment does not establish the cyclic shift for the case in which the $d_u$ value is less than the $N_{cs}$ value.

(2) $N_{CS} \le d_u < (N_{ZC}/3)$

Figure 16:
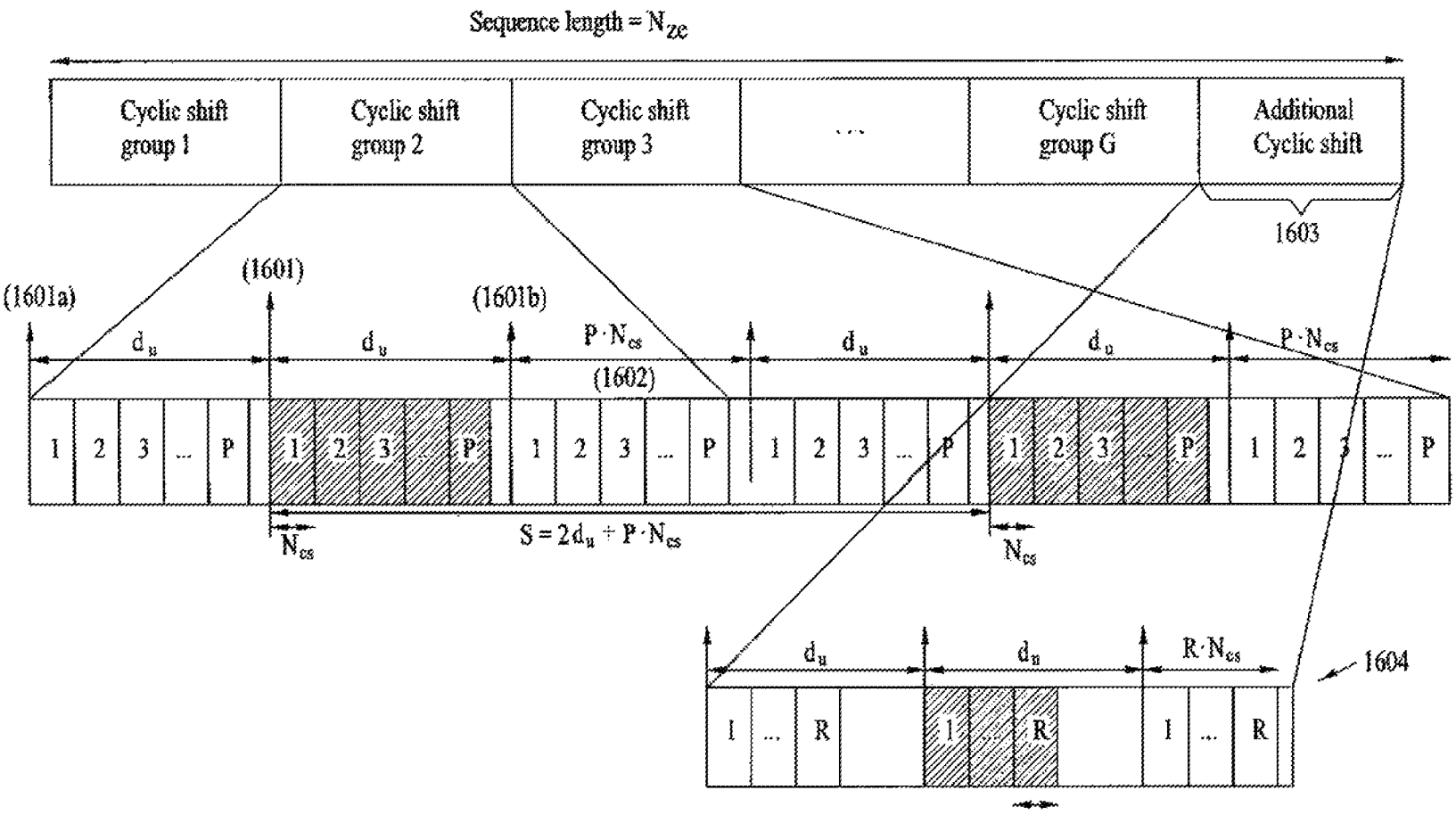
FIG. 16 is a conceptual diagram illustrating a method for calculating a variable establishing the cyclic shift within the interval of $N_{CS} \leq d_u < (N_{ZC}/3)$ according to the present invention.

FIG. 16 is a conceptual diagram illustrating a method for calculating a variable establishing the cyclic shift within the interval of $N_{CS} \le d_u < (N_{ZC}/3)$ according to the present invention.

As shown in FIG. 16, the cyclic shift area generated by the Doppler frequency occurs in the interval of $N_{CS} \le d_u < (N_{ZC}/3)$. Specifically, the cyclic shift area appears in the range of a sequence length located at both sides of the intended cyclic shift.

According to this embodiment, the cyclic shift areas caused by the Doppler frequency of both sides of the cyclic shift may be grouped into a single group. Also, the present invention determines how many Ncs values can be used without overlapping with others within the "$d_u$" range. The number of restricted cyclic shifts available for each group may be set to P. Namely, the P value can be calculated by the following equation 26:

$$P=\lfloor d_u/N_{CS} \rfloor \quad \text{[Equation 26]}$$

The distance between a specific channel response 1601 and the alias 1601a caused by the Doppler shift is denoted by "$d_u$". The distance between the specific channel response 1601 and the other alias 1601b caused by the Doppler shift is denoted by "$d_u$".

If the P cyclic shifts are applied to each group, aliases generated in the left area on the basis of the channel response 1601 are contained in the $d_u$ range, and other aliases generated in the right area on the basis of the channel response 1601 may exist outside of the $d_u$ range.

In this case, in the case of considering all the aliasing operations of P channel responses generated in the right area, a corresponding length corresponds to $P \cdot N_{CS}$ (1602).

Therefore, the length (S) of a single cyclic shift group may be equal to the sum of the "$d_u$" length and the "$P \cdot N_{CS}$" length, and is represented by the following equation 27:

$$S=2 \cdot d_u+P \cdot N_{CS} \quad \text{[Equation 27]}$$

In the meantime, the number of cyclic shift groups in total sequences may be calculated by dividing the total sequence length ($N_{zc}$) by the group length (S), and can be represented by the following equation 28:

$$G=\lfloor N_{ZC}/S \rfloor \quad \text{[Equation 28]}$$

In the meantime, as shown in FIG. 16, a specific area 1603 less than the group length (S) may be left. The length of the "1603" area corresponds to "$N_{ZC}-G \cdot S$", where $N_{ZC}$ is the length of an overall sequence, G is the number of groups, and S is the group length.

If $N_{ZC}-G \cdot S-2d_u$ is higher than $N_{CS}$, the additional cyclic shift may also be applied to the above-mentioned area 1603, and a detailed description thereof is shown at the "1604" area of FIG. 16. Therefore, provided that the number of cyclic shifts which are not based on the cyclic shift group is R, the R value can be represented by the following equation 29:

$$R=\max(\lfloor (N_{ZC}-2 \cdot d_u-G \cdot S)/N_{CS} \rfloor,0) \quad \text{[Equation 29]}$$

(3) $(N_{ZC}/3) \le d_u < (N_{ZC}-N_{CS})/2$

Figure 17:
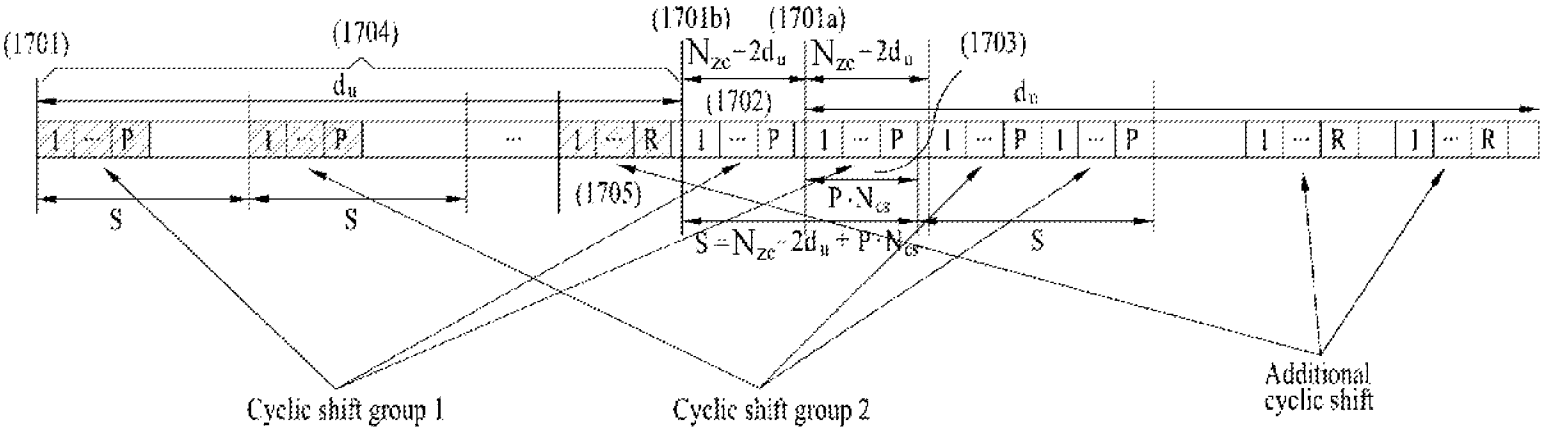
FIG. 17 is a conceptual diagram illustrating a method for calculating a variable establishing the cyclic shift within the interval of $(N_{ZC}/3) \leq d_u < (N_{ZC} - N_{CS})/2$ according to the present invention.

FIG. 17 is a conceptual diagram illustrating a method for calculating a variable establishing the cyclic shift within the interval of $(N_{ZC}/3) \le d_u < (N_{ZC}-N_{CS})/2$ according to the present invention.

In the area of $(N_{ZC}/3) \leq d_u$, differently from the above-mentioned (2) case (i.e., the aforementioned (2) case of $N_{CS} \leq d_u < (N_{ZC}/3)$), positions of the channel response and the aliasing caused by the Doppler shift exceed the total sequence length $N_{ZC}$, so that the aliasing may occur between the channel response of the ideal case and the $d_u$ range.

For example, the peak located at the "1701" position of FIG. 17 the aliasing may occur at positions 1701a and 1701b by the (+/−) Doppler shift. Therefore, the number of cyclic shifts applicable to a single cyclic shift group in this (3) case is decided by the "$N_{ZC}-2d_u$" area (1702) located at the center of FIG. 17, so that the number P of restricted cyclic shifts applicable to each group can be calculated by the following equation 30:

$$P=\lfloor (N_{ZC}-2\cdot d_u)/N_{CS} \rfloor \quad \text{[Equation 30]}$$

In this (3) case, the length S of each cyclic shift group can be represented by the following equation 31:

$$S=N_{ZC}-2\cdot d_u+P\cdot N_{CS} \quad \text{[Equation 31]}$$

The variable S is equal to the sum of the length of the 1702 area $(N_{ZC}-2d_u)$ and the length of the 1703 area corresponding to the "$P\cdot N_{CS}$" length. The "$P\cdot N_{CS}$" length is variable with the number of cyclic shifts applicable to each real group located at the right side In the meantime, the above-mentioned (3) case determines the number of cyclic shift groups in a given ZC sequence by considering how many lengths (S, where S=the length of a specific group) will be permitted in the $d_u$ range (1704), whereas the above-mentioned (2) case has determined the number of cyclic shift groups in such a given ZC sequence by considering how many lengths (S) will be permitted in the total sequence length Nzc.

The spacing between a specific channel response and two aliases of this channel response exceeds the total sequence range, so that the present invention controls the individual aliases not to overlap with each other within the $d_u$ range. The number of cyclic shift groups can be represented by the following equation 32:

$$G=\lfloor d_u/S \rfloor \quad \text{[Equation 32]}$$

Finally, the cyclic shift group is established in the $d_u$ range (1704) as described above, and the 1705 area having the length shorter than that of the cyclic shift group may be left. This length of the 1705 area corresponds to "$d_u-G\cdot S$". If the length of the 1705 area is longer than $N_{cs}$, the additional cyclic shift may be applied to this length.

Therefore, the number R of additional cyclic shifts can be represented by max $(\lfloor (d_u-G\cdot S)/N_{CS} \rfloor)$.

If the length (S) of each cyclic shift group is higher than "P", the additional cyclic shifts corresponding to the number of more than "P" may overlap with the (+0 aliasing area in the right area. Therefore, this embodiment may indicate the number R of additional cyclic shifts as shown in the following equation 33:

$$R=\min(\max(\lfloor (d_u-G\cdot S)/N_{CS} \rfloor,0),P) \quad \text{[Equation 33]}$$

(4) $(N_{ZC}-N_{CS})/2 \leq d_u$

Referring to FIG. 17, the $N_{ZC}-2d_u$ area (1702) located at the center part must be larger than $N_{cs}$, so that the cyclic shift can be applied to each group. Namely, this requirement can be represented by $N_{ZC}-2d_u > N_{CS}$.

If the above-mentioned requirement is represented in different ways on the basis of the $d_u$ value, it can be recognized that the equation $N_{ZC}-N_{CS} > 2d_u$ (i.e., $(N_{ZC}-N_{CS})/2 > d_u$) must be satisfied. Therefore, this embodiment does not establish the restricted cyclic shift in the range of $(N_{ZC}-N_{CS})/2 \leq d_u$.

Based on the above-mentioned explanation of the individual intervals, a detailed description of only the restricted set contained in Equation 25 will hereinafter be disclosed. Firstly, the restricted set of Equation 25 can be represented by the following equation 34.

$$C_v=S\cdot\lfloor v/P \rfloor+(v \bmod P)\cdot N_{CS},\ v=0, 1, \ldots, (P\cdot G+R-1) \quad \text{[Equation 34]}$$

The individual terms for use in the above cyclic shift will hereinafter be described.

In Equation 34, $S\cdot\lfloor v/P \rfloor$ is indicative of a start point of each cyclic shift group. If the v value is less than the number P of cyclic shifts for each group, $S\cdot\lfloor v/P \rfloor$ is indicative of "0". If the v value is higher than the number P of cyclic shifts for each group and is less than "2P", $S\cdot\lfloor v/P \rfloor$ is indicative of "S" corresponding to the length of a single cyclic shift group.

If the v value is higher than "2P" and is less than 3P, $S\cdot\lfloor v/P \rfloor$ is indicative of "2S" corresponding to the length of two cyclic shift groups.

$(v \bmod P)\cdot N_{CS}$ is indicative of the position of the cyclic shift applied to each group (or the position of an additional cyclic shift). In other words, the v value is shifted to another position by a predetermined distance $N_{cs}$ at intervals of the P time.

The v value of Equation 34 (or Equation 25 including Equation 34) does not discriminate between the groups or components of the groups, and is indicative of the total number of cyclic shifts. As a result, the total number of cyclic shifts can be represented by P·G+R.

MODIFIED EXAMPLES

A variety of modified examples applicable to the present invention will hereinafter be described.

Although the above-mentioned best mode has disclosed the specific case in which there is no restriction in the start point of the cyclic shift, the present invention can be applied to not only the above-mentioned case but also other restricted cases.

Not only the above-mentioned best mode, but also all the embodiments capable of being more generally applied to the present invention will hereinafter be described.

The position at which the alias occurs by the (+) Doppler frequency is denoted by the "+offset" position, and the position at the alias occurs by the (−) Doppler frequency is denoted by "−offset" position.

Figure 18:
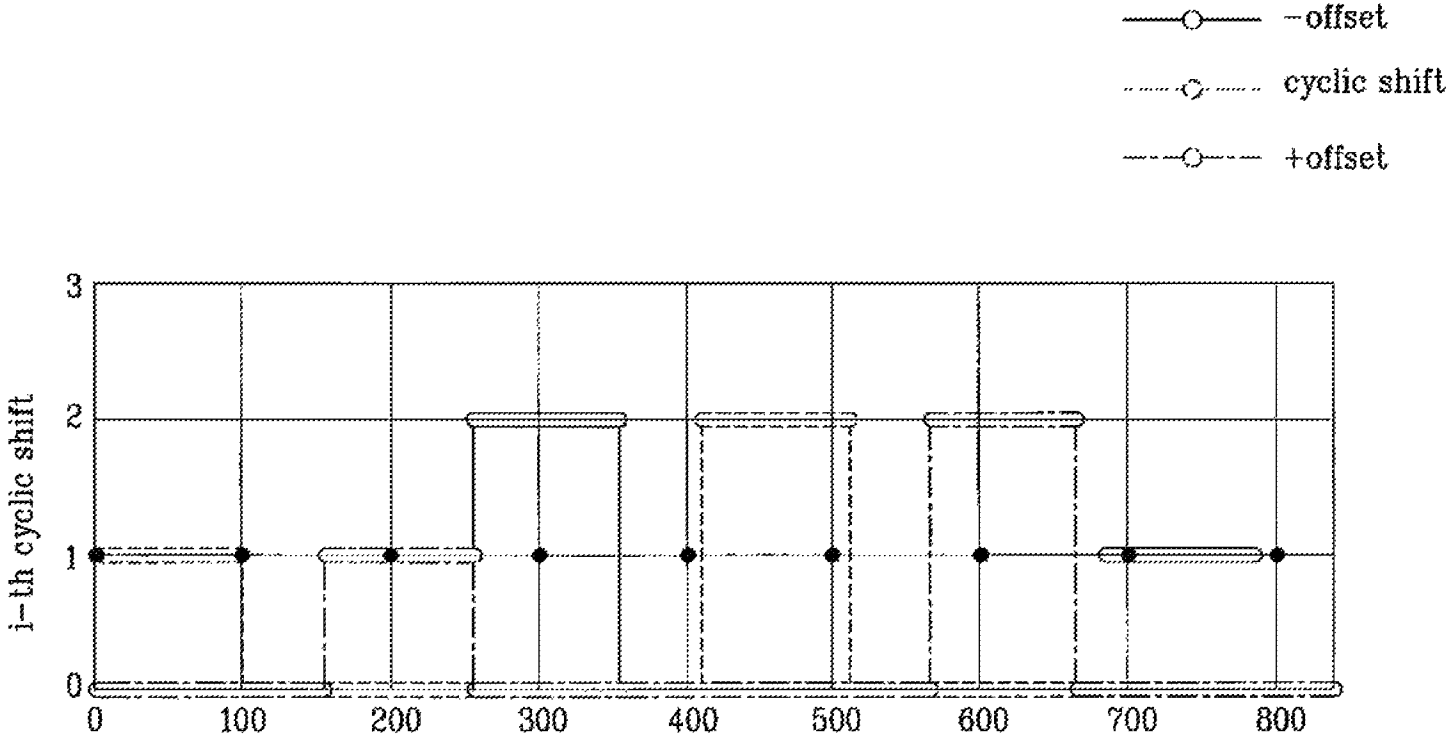
FIGS. 18 and 19 are conceptual diagrams illustrating a method for reducing the number of ZCZ preamble sequences due to an alias response in the case of Nzc=839, Ncs=100, and $d_u$=155 according to the present invention.
Figure 19:
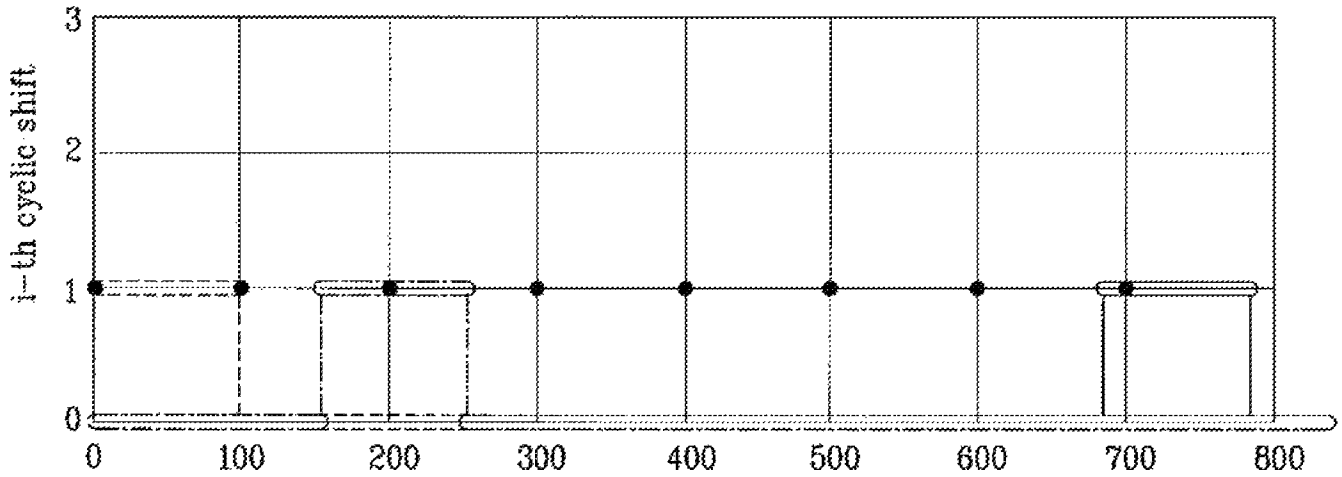

FIGS. 18 and 19 are conceptual diagrams illustrating a method for reducing the number of ZCZ preamble sequences due to an alias response in the case of Nzc=839, Ncs=100, and $d_u$=155 according to the present invention.

The cyclic shift of FIG. 18 can begin at any position. The cyclic shift of FIG. 19 can be performed at only the $N_{cs}$-multiple position. The $N_{cs}$ value of FIG. 18 is equal to that of FIG. 19, however, start positions of the individual cyclic shifts are different in FIGS. 18 and 19.

In conclusion, the case of FIG. 18 can construct many more cyclic shifts than those of FIG. 19. In more detail, the case of FIG. 18 eliminates the restriction of the start position of the cyclic shift, so that it can acquire the additional restricted cyclic shift.

Figure 20:
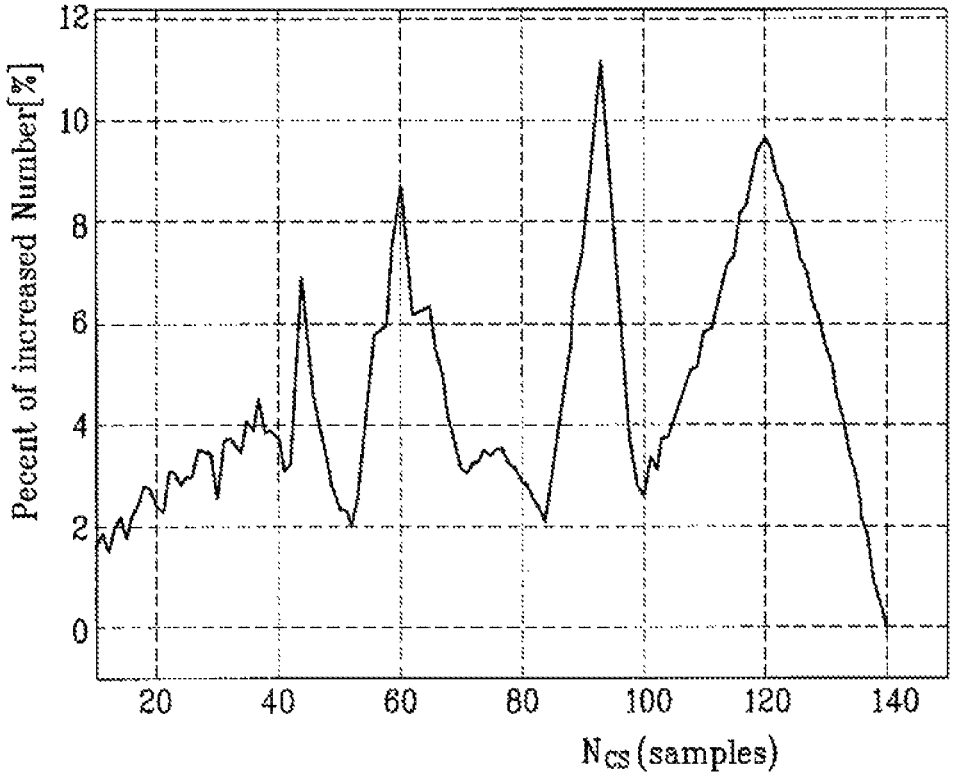
FIG. 20 is a conceptual diagram illustrating the increasing ratio of an available restricted cyclic shift after the restriction of a start location of the cyclic shift is removed in the case of Nzc=839 according to the present invention.

FIG. 20 is a conceptual diagram illustrating the increasing ratio of an available restricted cyclic shift after the restriction of a start location of the cyclic shift is removed in the case of Nzc=839 according to the present invention;

The elimination of the restriction in the cyclic shift starting may not increase the hardware complexity.

Therefore, the restricted cyclic shift having no consideration in the pre-defined shift position is preferred, and the above-mentioned best mode is established under the aforementioned assumption.

However, the present invention can also be applied to the restricted cyclic shift having the pre-defined shift position, so that the following description will disclose the above-mentioned two cases.

Firstly, the restricted cyclic shift case (i.e., Case 1) having no consideration in the pre-defined shift position will hereinafter be described.

Equation 21 indicates the alias distance, irrespective of the preamble generation domain. The number of restricted available cyclic shifts per root ZC sequence is differently decided according to the root index and the $N_{cs}$ value, so that different equations for use in different alias-distance ranges are required.

Specifically, there are two alias-distance ranges in which there is no discrimination between alias responses. The range in which the restricted cyclic shift can be used is set to $Ncs \le d_u \le (Nzc-Ncs)/2$. In this range, the cyclic shift range and two alias ranges are not overlapped with each other.

In this case, if the preamble is generated in the frequency domain, the "$d_u$" value is set to "u" as denoted by $d_u=u$. If the preamble is generated in the time domain, the "$d_u$" value is set to "1/u mod Nzc" as denoted by $d_u=1/u \bmod Nzc$. The number of restricted cyclic shifts can be represented by the following equation 35:

$$N_{shift}(d_u) = \begin{cases} P \cdot G + R, & \text{for } N_{CS} \le d_u \le (N_{ZC} - N_{CS})/2 \\ 0, & \text{o/w} \end{cases} \quad \text{[Equation 35]}$$

In Equation 35, "P" is indicative of the number of restricted cyclic shifts per group, "G" is indicative of the number of groups generated in a single preamble sequence, and "R" is indicative of the number of restricted additional cyclic shifts which is not based on the additional group.

The available range of the restricted cyclic shift is denoted by $Ncs \le d_u \le (Nzc-Ncs)/2$. This interval "$Ncs \le d_u \le (Nzc-Ncs)/2$" can be divided into "$Ncs \le d_u < (Nzc/3)$" and "$(Nzc/3) \le d_u \le (Nzc-Ncs)/2$" on the basis of Nzc/3.

The reason why the alias-distance range is divided into "$Ncs \le d_u < (Nzc/3)$" and "$(Nzc/3) \le d_u \le (Nzc-Ncs)/2$" on the basis of Nzc/3 has already been disclosed.

Therefore, "$Ncs \le d_u \le (Nzc-Ncs)/2$" is differently decided on the basis of "Nzc/3". The range of $Ncs \le d_u < (Nzc/3)$ and the range of $(Nzc/3) \le d_u \le (Nzc-Ncs)/2$ will hereinafter be described.

If the start position of the first group is set to "0", the $V_a$-th restricted cyclic shift range is defined by $[C_{Va,\,start}, C_{Va,\,end}]$ in Equations 36 and 37.

$$C_{V_a,start} = \begin{cases} g \cdot S + p \cdot N_{CS}, & \text{for } v = P \cdot g + p, \\ & p = 0, 1, \ldots, P-1, \\ & g = 0, 1, K, G-1 \\ G \cdot S + r \cdot N_{CS}, & \text{for } v = P \cdot G + r, \\ & r = 0, 1, \ldots, R-1 \end{cases} \quad \text{[Equation 36]}$$

$$C_{Va,end} = C_{Va,start} + N_{CS-1} \quad \text{[Equation 37]}$$

The alias occurs at the positions of the following equations 38 and 39:

$$F_{v_a,start}^{\pm}(d_u) = (C_{v_a,start} \pm d_u)_{N_{ZC}} \quad \text{[Equation 38]}$$

$$F_{v_a,end}^{\pm}(d_u) = (C_{v_a,end} \pm d_u)_{N_{ZC}} \quad \text{[Equation 39]}$$

In Equation 39, "$(\ )_{Nzc}$" is indicative of a modular operation.

Firstly, the alias-distance range $Ncs \le d_u < (Nzc/3)$ (i.e., the alias-distance range 1) has $G=\lfloor N_{ZC}/S \rfloor$ number of groups. Each group includes $P=\lfloor d_u/N_{CS} \rfloor$ number of restricted cyclic shifts. The length of each group is denoted by $S=2 \cdot d_u + P \cdot N_{CS}$. If the available additional cyclic shift is a positive(+) number, the R value is denoted by $R=\lfloor (N_{ZC}-G \cdot S-2 \cdot d_u)/N_{CS} \rfloor$.

Figure 21:
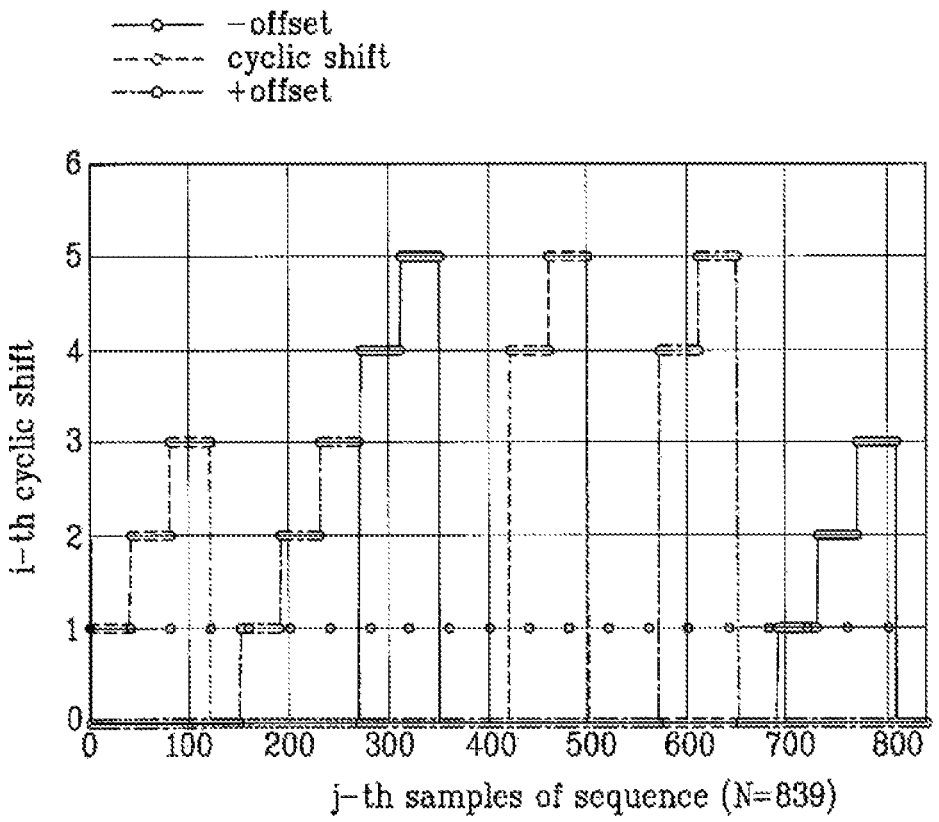
FIG. 21 is a conceptual diagram illustrating an exemplary cyclic shift in the case of Nzc=839, Ncs=40, and $d_u$=150 according to one embodiment of the present invention.

FIG. 21 is a conceptual diagram illustrating an exemplary cyclic shift in the case of Nzc=839, Ncs=40, and $d_u=150$ according to one embodiment of the present invention. Each group has three cyclic shifts, and two additional cyclic shifts exist in the remaining ranges. In this example, the total number of restricted cyclic shifts is "5".

According to one embodiment, the present invention applies the number of calculated groups, the number of restricted cyclic shifts per group, and the group length to Equations 36 and 37, and then establishes the cyclic shift-applying interval in consideration of the above-mentioned parameters.

Next, in the alias-distance range $(Nzc/3) \le d_u \le (Nzc-Ncs)/2$ (i.e., the alias-distance range 2), the number of available cyclic shifts per group is denoted by $P=\lfloor (N_{ZC}-2 \cdot d_u)/N_{CS} \rfloor$, the length of each group is denoted by $S=N_{ZC}-2 \cdot d_u+P \cdot N_{CS}$, and there are G groups (where $G=\lfloor d_u/S \rfloor$).

The additional cyclic shift is selected from among the center part and the residual part of the right side. In this case, the selected cyclic shifts should be the smallest number of cyclic shifts. Namely, if the R value is a positive number, the number of additional cyclic shifts is denoted by $R=\min(\lfloor (d_u-G \cdot S)/N_{CS} \rfloor, P)$. The start position of the Va-th restricted cyclic shift is calculated by applying the above-mentioned parameters to Equations 36 and 37.

Figure 22:
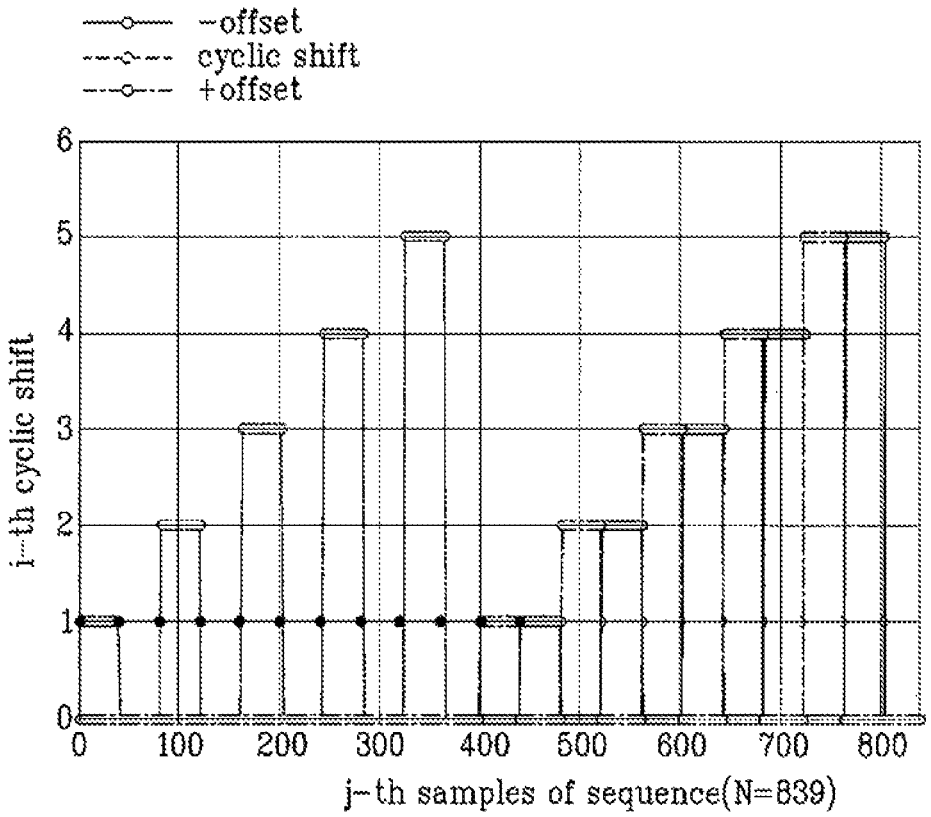
FIG. 22 is a conceptual diagram illustrating an exemplary cyclic shift in the case of Nzc=839, Ncs=40, and $d_u$=399 according to one embodiment of the present invention.

FIG. 22 is a conceptual diagram illustrating an exemplary cyclic shift in the case of Nzc=839, Ncs=40, and $d_u=399$ according to one embodiment of the present invention. Each group There are four groups, each of which has a single cyclic shift and a single additional cyclic shift. In this example, the total number of restricted cyclic shifts is 5.

According to this embodiment, the present invention applies the number of calculated groups, the number of restricted cyclic shifts per group, and the group length to Equations 36 and 37, and then establishes the cyclic shift-applying interval in consideration of the above-mentioned parameters.

Indeed, the equal sing (=) between two alias distance ranges may have no meaning or the relatively-low importance. For example, in the case of using the ZC sequence having the length of 839, the (Nzc/3) value is equal to 279.67 (i.e., (Nzc/3)=279.67), so that the divided ranges $Ncs \le d_u < (Nzc/0)$ and $(Nzc/3) \le d_u \le (Nzc-Ncs)/2$ may have the same results as those of the divided ranges $Ncs \le d_u \le (Nzc/3)$ and $(Nzc/3) < d_u \le (Nzc-Ncs)/2$.

Next, the restricted cyclic shift (i.e., Case 2) considering the pre-defined shift position will hereinafter be described.

A method for generating the restricted cyclic shift using the pre-defined shift position is changed to another method. Each alias-distance range includes not only G groups, each of which has P cyclic shifts, but also a first additional cyclic shift out of the $R_1$ groups.

In the case of using the pre-defined shift position, the present invention has a particular additional cyclic shift, differently from the other case in which no pre-defined shift position exists in the alias-distance range 2-area.

In the alias-distance range 2-area, the main region generally appears in the front samples of the sequence, and the alias regions generally appear in the rear samples of the sequence. However, according to the Case 2, the main region appears in the rear samples of the sequence, and the alias regions appear in the front samples of the sequence.

The second additional cyclic shift is denoted by $R_2$. The second additional cyclic shift does not appear in the alias-distance range 1. The total number of restricted cyclic shifts can be represented by the following equation 40:

$$N_{shift}(d_u) = \begin{cases} P\cdot G + R_1 + R_2, & \text{for } N_{CS} \le d_u \le (N_{ZC} - N_{CS})/2 \\ 0, & \text{o/w} \end{cases} \quad \text{[Equation 40]}$$

Provided that the start position of the first group is "0", the $V_a$-th restricted cyclic shift is defined in $[C_{Va,\,start}, C_{Va,\,end}]$ as denoted by Equations 41 and 42:

$$C_{V_a,start} = \begin{cases} g\cdot S + p\cdot N_{CS}, & \text{for } v = P\cdot g + p, \\ & p = 0, 1, \ldots, P-1, \\ & g = 0, 1, K, G-1 \\ G\cdot S + r_1\cdot N_{CS}, & \text{for } v = P\cdot G + r_1, \\ & r_1 = 0, 1, \ldots, R_1 - 1 \\ \lceil (N_{2C} - d_u + P\cdot N_{CS} + (G-1)S)/N_{CS}\rceil\cdot N_{CS} + r_2\cdot N_{CS}, & \text{for } v = P\cdot G + R_1 + r_2, \\ & r_2 = 0, 1, \ldots, R_2 - 1 \end{cases} \quad \text{[Equation 41]}$$

$$C_{Va,end} = C_{Va,start} + N_{CS} - 1 \quad \text{[Equation 42]}$$

The related alias occurs at positions of the following equations 43 and 44:

$$F_{v_a,start}^{\pm}(d_u) = (C_{v_a,start} \pm d_u)_{N_{ZC}} \quad \text{[Equation 43]}$$

$$F_{v_a,end}^{\pm}(d_u) = (C_{v_a,end} \pm d_u)_{N_{ZC}} \quad \text{[Equation 44]}$$

In Equations 43 and 44, $(\ )_{Nzc}$ is indicative of a modular operation.

In the alias-distance range $Ncs \le d_u < (Nzc/3)$ (i.e., the alias-distance range 1), G groups (where, $G = \lfloor N_{ZC}/S \rfloor$) exists, P restricted cyclic shifts (where, $P = \lfloor d_u/N_{CS} \rfloor$) exists, and the group length is denoted by $S = (\lceil 2d_u/N_{CS} \rceil + P)\cdot N_{CS}$. If the $R_1$ value is a positive(+) number, the number of the first additional cyclic shifts is denoted by $R_1 = \lfloor (N_{ZC} - G\cdot S - 2\cdot d_u)/N_{CS} \rfloor$.

Figure 23:
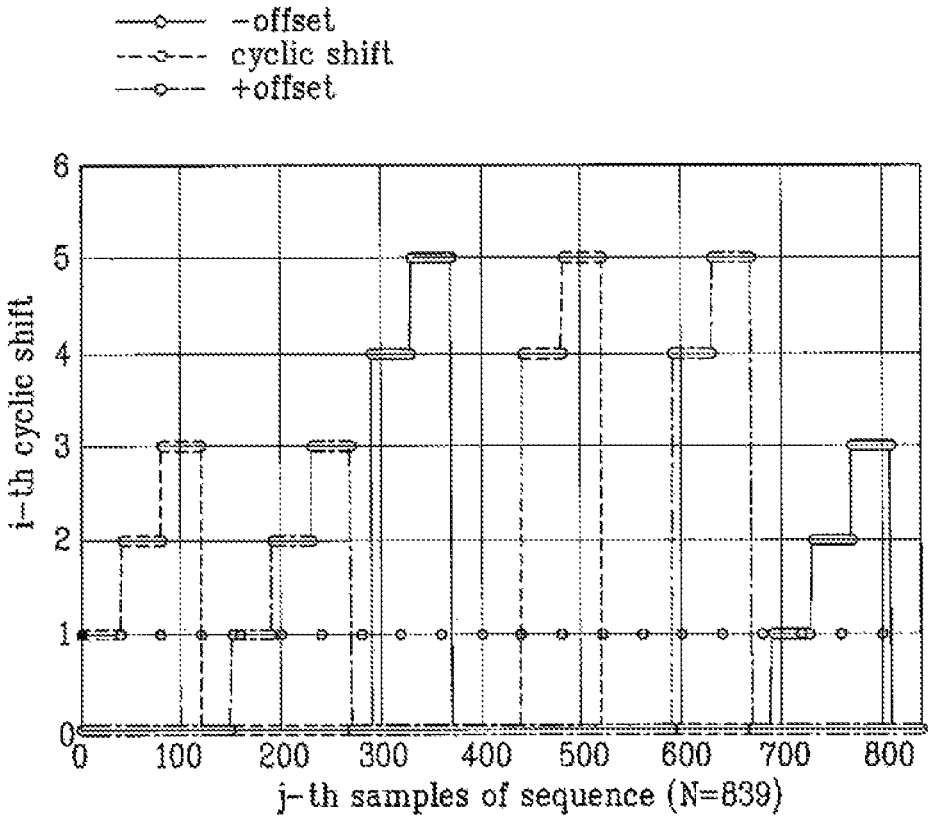
FIG. 23 is a conceptual diagram illustrating an exemplary cyclic shift in the case of Nzc=839, Ncs=40, and $d_u$=150 according to another embodiment of the present invention.

FIG. 23 is a conceptual diagram illustrating an exemplary cyclic shift in the case of Nzc=839, Ncs=40, and $d_u$=150 according to another embodiment of the present invention. In FIG. 23, each group includes three cyclic shifts and two cyclic shifts. In this example, the total number of restricted cyclic shifts is "5".

According to this embodiment, the present invention applies the number of calculated groups, the number of restricted cyclic shifts per group, and the group length to Equations 41 and 42, and then establishes the cyclic shift-applying interval in consideration of the above-mentioned parameters.

Next, in the alias-distance range $(Nzc/3) \le d_u \le (Nzc - Ncs)/2$ (i.e., the alias-distance range 2), the number of available cyclic shifts per group is denoted by $P = \lfloor (N_{ZC} - 2\cdot d_u)/N_{CZ} \rfloor$, the length of each group is denoted by $S = (\lceil (N_{ZC} - 2\cdot d_u)/N_{CS} \rceil + P)\cdot N_{CS}$, and there are G groups (where $G = \lfloor d_u/S \rfloor$).

The first additional cyclic shift is calculated by the same method as that of the alias-distance range 1. If the $R_1$ value is a positive number, the number of first additional cyclic shifts is denoted by $R = \min(\lfloor (d_u - G\cdot S)/N_{CZ} \rfloor, P)$.

If the $R_1$ value is equal to "0" (i.e., $R_1 = 0$), the presence or absence of a second additional cyclic shift must be determined. The shape of the second additional cyclic shift is the opposite of the shape of the conventional cyclic shift, as shown in the last cyclic shift of FIG. 23.

The present invention determines whether the alias range of the second additional cyclic shift is an available range (i.e., $d_u - [P\cdot N_{CS} + (G-1)\cdot S] \ge N_{ZC} - 2d_u + N_{CS}$), and determines whether the cyclic shift interval is available (i.e., $X + N_{CS} \le 2d_u$). If it is determined that the cyclic shift interval is available (i.e., $X + N_{CS} \le 2d_u$).

Figure 24:
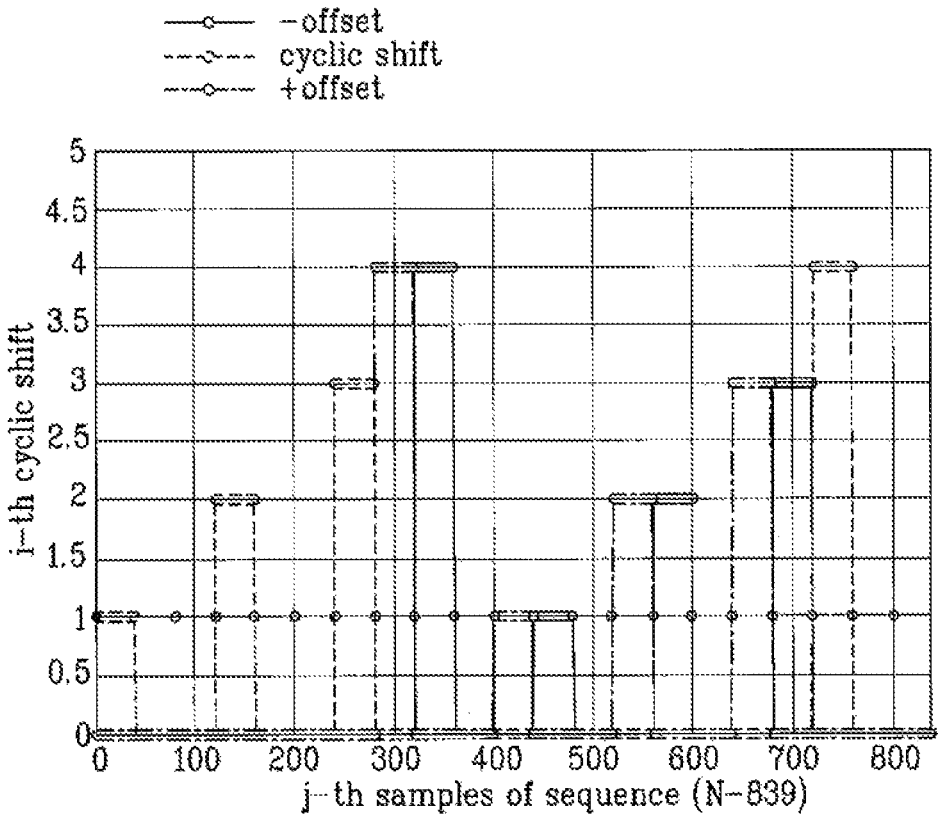
FIG. 24 is a conceptual diagram illustrating an exemplary cyclic shift in the case of Nzc=839, Ncs=40, and $d_u$=399 according to another embodiment of the present invention.

FIG. 24 is a conceptual diagram illustrating an exemplary cyclic shift in the case of Nzc=839, Ncs=40, and $d_u$=399 according to another embodiment of the present invention. In FIG. 24, each group includes three cyclic shifts and no first additional cyclic shift (i.e., zero first additional cyclic shift). And, each group further includes a single additional cyclic shift in which a relative position of the main region is opposite to that of the alias region. This second additional cyclic shift does not occur when the fixed cyclic shift position is not used, as shown in FIG. 22. In this example, the number of total restricted cyclic shifts is "4".

According to this embodiment, the present invention applies the number of calculated groups, the number of restricted cyclic shifts per group, and the group length to Equations 41 and 42, and then establishes the cyclic shift-applying interval in consideration of the above-mentioned parameters.

According to another embodiment, a specific system with the fixed cyclic shift may determine the cyclic shift according to the following method.

Firstly, the total sequence range is divided by the cyclic shift value.

Next, the present invention searches for the range (±u or ±(m*Nzc−1)/u) in which the interference caused by the offset occurs in the first range (i.e., n=1). In this case, there are a plurality of ranges, each of which has the interference.

For example, in the case of considering only the first interference, a maximum number of interference generation ranges may be set to "4".

Next, if the first range is not overlapped with all of the interference ranges caused by the offset, the first range is set to an available range, and the remaining ranges caused by the offset is set to a restricted range (also called a prohibition range).

The present invention goes to the next range (i.e., n=n+1), and repeatedly searches for the range in which the interference is generated by the offset.

While the present invention searches for the interference generation range in the n-th range, if an observation range, several ranges caused by the offset, an pre-established available range, and pre-established prohibition ranges are not overlapped with each other, the present invention determines a current range to be an available range, and determines the above several ranges caused by the offset associated with the current range to be prohibition ranges. If the above-mentioned process is repeated until reaching the last range, the present invention may determine the cyclic shift in the system including the fixed cyclic shift.

According to still another embodiment, the present invention may apply the aforementioned established cyclic shift-applying interval to only the high-mobility cell in a mobile communication system including several cells.

In this case, the present invention may determine whether a corresponding cell has the high mobility by determining whether the frequency offset associated with the cell is higher than a predetermined level after acquiring the cell information. In this case, the predetermined level is indicative of a frequency offset value, which can be readily decided or modified by those skilled in the art.

Preferably, the present invention may control the Node-B or the UE to determine whether the corresponding cell is the high-mobility cell. However, the UE has difficulty in estimating the frequency offset value of each of other UEs contained in the cell. Therefore, it is more preferable that the Node-B determines whether the corresponding cell is the high-mobility cell in consideration of several UEs of the cell, and broadcasts the resultant signal over the broadcast channel.

In the meantime, if it is determined that the corresponding cell is not indicative of the high-mobility cell, the present invention may include a process for allocating a sequence unallocated to the high-mobility cell.

The following description shows that equations are modified into others under the same condition as that of the best mode, and a detailed description thereof will hereinafter be described.

In association with the best mode, the above-mentioned equations may also be denoted by the following expression.

If $C_v=S\cdot\lfloor v/P\rfloor+(v \bmod P)\cdot N_{CS}$, $v=0, 1, \ldots, (P\cdot G+R-1)$ and $E=\lfloor d_u/N_{CS}\rfloor$, $F=\lfloor (N_{ZC}-2d_u)/N_{CS}\rfloor$, in the alias-distance range of $Ncs\le d_u<(Nzc/3)$, the P and G values are denoted by $P=E$, $S=2d_u+E\cdot N_{CS}$, $G=\lfloor F\cdot N_{CS}/S\rfloor$.

If $C_v=S\cdot\lfloor v/P\rfloor+(v \bmod P)\cdot N_{CS}$, $v=0, 1, K, (P\cdot G+R-1)$ and $E=\lfloor d_u/N_{CS}\rfloor$, $F=\lfloor (N_{ZC}-2d_u)/N_{CS}\rfloor$, in the alias-distance range of $(Nzc/3)\le d_u\le(Nzc-Ncs)/2$, the P, S, G, and R values are denoted by $P=F$, $S=N_{ZC}-2d_u+F\cdot N_{CS}$, $G=\lfloor E\cdot N_{CS}/S\rfloor$, $R=\min(\lfloor (d_u-G\cdot S)/N_{CS}\rfloor,F)$.

Next, the case of the restricted cyclic shift considering the pre-defined shift position (Case 2) will hereinafter be described using other equations.

The u-th root ZC sequence having the region of zero correlation, i.e., the v-th random access preamble, is defined by $x_{u,v}(n)=x_u((n+C_v) \bmod N_{zc})$. In this case, the $C_v$ value is defined by equation 45:

$$C_v=\begin{cases} v\cdot N_{CS}, & v=0,1,\ldots,(\lfloor N_{ZC}/N_{CS}\rfloor-1), \text{ for low/middle mobility cell} \\ S\cdot\lfloor v/P\rfloor+(v \bmod P)\cdot N_{CS}, & v=0,1,\ldots,(P\cdot G+R-1), \text{ for high mobility cell} \end{cases} \quad \text{[Equation 45]}$$

wherein, $C_{P\cdot G+R_1+R_2-1}=X$, if $R_2=1$, for high mobility cell.

In this case, the parameters of the high-mobility cell can be defined by the following explanation.

In more detail, in the alias range of $Ncs\le d_u<(Nzc/3)$, the P value is denoted by $P=\lfloor d_u/N_{CS}\rfloor$, the S value is denoted by $S=(\lceil 2d_u/N_{CS}\rceil+P)\cdot N_{CS}$, and the G value is denoted by $G=\lfloor N_{ZC}/S\rfloor$. A first additional cyclic shift R1 is denoted by $R_1=\max(\lfloor (N_{ZC}-2\cdot d_u-G\cdot S)/N_{CS}\rfloor,0)$, and a second additional cyclic shift $R_2$ is denoted by $R_2=0$.

In the alias range of $(Nzc/3)\le d_u\le(Nzc-Ncs)/2$, the P value is denoted by $P=\lfloor (N_{ZC}-2\cdot d_u)/N_{CS}\rfloor$, the S value is denoted by $S=(\lfloor (N_{ZC}-2\cdot d_u)/N_{CS}\rfloor+P)\cdot N_{CS}$, and the G value is denoted by $G=\lfloor d_u/S\rfloor$. A first additional restricted cyclic shift is denoted by $R_1=\min(\max(\lfloor (d_u-G\cdot S)/N_{CS}\rfloor,0),P)$, a second additional restricted cyclic shift $R_2$ is denoted by $R_2=1$ in the case of $R_1=0$ and "$X-Ncs<2\,d_u$". In this case, the X value is denoted by $X=\lceil (N_{ZC}-d_u+P\cdot N_{CS}+(G-1)S)/N_{CS}\rceil\cdot N_{CS}$.

In the restricted cyclic shift case of $x_{u,v}(n)=x_u((n+C_v) \bmod N_{zc})$, the method for directly using the shift value of the v-th restricted cyclic shift has been disclosed. Differently from the method, another method for employing the Va value for Va-th restricted cyclic shift so that the restricted cyclic shift can be applied to the present invention. In more detail, the similar cyclic shift can be generated using the equation of $x_{u,v_a}(n)=x_u((n+\mathrm{round}(v_aN_{cs})) \bmod N_{zc})$.

In the case of generating the cyclic shift using the above-mentioned method, the basic concept is equal to those of the above-mentioned methods. However, different equations are applied to the above-mentioned methods.

The case (Case 1) of the restricted cyclic shift having no consideration in the pre-defined shift position will be described using other equations.

The index (v) for the cyclic shift is represented by the following equation 46:

$$v=\begin{cases} g\cdot S+p, & \text{for } v=P\cdot g+p,\ p=0,1,\ldots,P-1,\ g=0,1,K,G-1 \\ G\cdot S+r, & \text{for } v=P\cdot G+r,\ r=0,1,\ldots,R-1 \end{cases} \quad \text{[Equation 46]}$$

In the alias range of $Ncs\le d_u<(Nzc/3)$, the P value is denoted by $P=\lfloor d_u/N_{cs}\rfloor$, the S value is denoted by $S=2d_u/N_{CS}+P$, and the G value is denoted by $G=\lfloor N_{ZC}/(S\cdot N_{CS})\rfloor$, and the additional restricted cyclic shift R is denoted by $R=\max(\lfloor (N_{ZC}-2\cdot d_u)/N_{CS}-G\cdot S\rfloor,0)$.

In the alias range of $(Nzc/3)\le d_u\le(Nzc-Ncs)/2$, the P value is denoted by $P=\lfloor (N_{ZC}-2\cdot d_u)/N_{CS}\rfloor$, the S value is denoted by $S=(N_{ZC}-2d_u)/N_{CS}+P$, the G value is denoted by $G=\lfloor d_u/(S\cdot N_{CS})\rfloor$, and the R value is denoted by $R=\min(\max(\lfloor d_u/N_{CS}-G\cdot S\rfloor,0),P)$.

If $E=\lfloor d_u/N_{CS}\rfloor$, $F=\lfloor (N_{ZC}-2d_u)/N_{CS}\rfloor$, the above-mentioned expression can be represented by other ways. In more detail, in the alias range of $Ncs\le d_u<(Nzc/3)$, the P value is denoted by $P=E$, the S value is denoted by $S=2d_u/N_{CS}+E$, the G value is denoted by $G=\lfloor F/S\rfloor$, and the R value is denoted by $R=\min(\lfloor (N_{ZC}-2\cdot d_u)/N_{CS}-G\cdot S\rfloor,E)$.

In the alias range of $(Nzc/3)\le d_u\le(Nzc-Ncs)/2$, the P value is denoted by $P=F$, the S value is denoted by $S=N_{ZC}/N_{CS}-2d_u/N_{CS}+P$, the G value is denoted by $G=\lfloor E/S\rfloor$ and the R value is denoted by $R=\min(\lfloor d_u/N_{CS}-G\cdot S\rfloor,F)$.

Next, the restricted cyclic shift case (Case 2) considering the pre-defined shift position will be described using other equations.

The index (v) for the cyclic shift is represented by the following equation 47:

$$v=\begin{cases} g\cdot S+p, & \text{for } v=P\cdot g+p,\ p=0,1,\ldots,P-1,\ g=0,1,\ldots,G-1 \\ G\cdot S+r_1, & \text{for } v=P\cdot G+r_1,\ r_1=0,1,\ldots,R_1-1 \\ X+r_2, & \text{for } v=P\cdot G+R_1+r_2,\ r_2=0,1,\ldots,R_2-1 \end{cases} \quad \text{[Equation 47]}$$

In the alias range of $Ncs \le d_u < (Nzc/3)$, the P value is denoted by $P=\lfloor d_u/N_{CS} \rfloor$, the S value is denoted by $A\,S=(\lceil 2d_u/N_{CS} \rceil+P)$, and the G value is denoted by $G=\lfloor N_{ZC}/(SN_{CS}) \rfloor$, and the additional restricted cyclic shift $R_1$ is denoted by $R_1=\max(\lfloor (N_{ZC}-G\cdot SN_{CS}-2\cdot d_u)/N_{CS} \rfloor,0)$.

In the alias range of $(Nzc/3) \le d_u \le (Nzc-Ncs)/2$, the P value is denoted by $P=\lfloor (N_{ZC}-2\cdot d_u)/N_{CS} \rfloor$, the S value is denoted by $S=(\lceil (N_{ZC}-2\cdot d_u)/N_{CS} \rceil+P)$, the G value is denoted by $G=\lfloor d_u/(SN_{CS}) \rfloor$, and the $R_1$ value is denoted by $R_1=\min(\max(\lfloor (d_u-G\cdot SN_{CS})/N_{CS} \rfloor,0),P)$.

If $R_1=0$ and $X\cdot N_{CS}+N_{CS} \le 2d_u$, the $R_2$ value can be represented by $R_2=1$. In this case, the X value is denoted by $X=\lceil (N_{ZC}-d_u+P\cdot N_{CS}+(G-1)SN_{CS})/N_{CS} \rceil$.

If $E=\lfloor d_u/N_{CS} \rfloor$; $s=d_u \bmod N_{CS}$; $E'=\lceil 2s/N_{CS} \rceil$ and $F=\lfloor (N_{ZC}-2d_u)/N_{CS} \rfloor$; $t=(N_{ZC}-2d_u) \bmod N_{CS}$; $E'=\lceil t/N_{CS} \rceil$, in the alias range of $Ncs \le d_u < (Nzc/3)$, the P value is denoted by $P=E$, the S value is denoted by $S=2F+F'$, the G value is denoted by $G=\lfloor E/S \rfloor$, and the R2 value is denoted by $R_2=\min(E-G\cdot S, F)$.

If $R_1=0$ and $X\cdot N_{CS} \le 2d_u-N_{CS}$, the $R_2$ value can be represented by $R_2=1$. In this case, the X value is denoted by $X=\lceil X'+F+(G-1)S \rceil$, $X'=(N_{ZC}-d_u)/N_{CS}$.

As described above, according to the above-mentioned embodiments, in the case of implementing the cyclic shifted sequence using the CAZAC sequence, the present invention may define the cyclic shift set capable of removing the shift ambiguity caused by the frequency- or timing-offset.

Also, in the case of accessing the unsynchronized channel, the frequency offset or the timing offset is not adjusted to this unsynchronized channel, so that the present invention can increase the strength of this channel.

According to the influence range of the pulse-shaping filter, the present invention may define the cyclic shift set in which the first-order interference, the second-order interference, and the higher order interference are considered.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

As apparent from the above description, the present invention can easily establish a cyclic shift (CS) interval at a specific location having no overlapping by considering a channel response of a reception (Rx) sequence and an alias location of this reception (Rx) sequence, although a reception (Rx) signal is shifted by a channel delay spreading or a propagation delay irrespective of categories of a domain generating a sequence, so that it can greatly reduce the number of the detection errors and the false alarm rate.

And, if a sequence of the cyclic shift (CS) is allocated to a cell having a frequency offset of more than a predetermined level, the present invention can minimize the influence of a frequency offset on a high-mobility cell.

The present invention relates to a first method for allocating a sequence to each cell in consideration of characteristics of the CAZAC sequence, and a second method for establishing the cyclic shift to be applied to the first method. Therefore, the present invention can be applied to a wireless communication system (e.g., a UE and a Node-B).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed:

1. A method for transmitting a random access preamble to a base station, the method performed by a user equipment and comprising:

generating the random access preamble from a Zadoff-Chu (ZC) sequence having a length $N_{ZC}$, wherein the random access preamble is defined by *using the ZC sequence with* cyclic shift ($C_v$) of the ZC sequence *applied to the ZC sequence*; and transmitting the random access preamble to the base station, wherein the $C_v$ satisfies the following Equation 1:

$$C_v=S\cdot\lfloor v/P \rfloor+(v \bmod P)\cdot N_{CS},\ v=0, 1, \ldots, (P\cdot G+R-1), \quad \text{[Equation 1]}$$

where 'G' represents a number of groups defined from the ZC sequence, 'S' represents a length of each of the groups, 'P' represents a number of cyclic shift opportunities for each of the groups, and 'R' represents a number of additional cyclic shifts, and wherein parameters of Equation 1 are given under condition of $N_{CS} \le d_u < (N_{ZC}/3)$ by:

$$P=\lfloor d_u/N_{CS} \rfloor,$$

$$S=2\cdot d_u+P\cdot N_{CS},$$

$$G=\lfloor N_{ZC}/S \rfloor, \text{ and}$$

$$R=\max(\lfloor (N_{ZC}-2\cdot d_u-G\cdot S)/N_{CS} \rfloor,0),$$

where '$N_{CS}$' is a cyclic shift unit and '$d_u$' is a variable corresponding to a Doppler shift of one subcarrier spacing.

2. The method according to claim 1, wherein the variable is given [by:]

$$d_u=\begin{cases} u^{-1} mod N_{ZC}, & 0 \le (u^{-1} mod N_{ZC}) < N_{ZC}/2 \\ N_{ZC}-(u^{-1} mod N_{ZC}), & N_{ZC}/2 \le (u^{-1} mod N_{ZC}) < N_{ZC} \end{cases} \text{ by:}$$

$$d_u=\begin{cases} m, & 0 \le m < N_{ZC}/2 \\ N_{ZC}-m, & N_{ZC}/2 \le m < N_{ZC} \end{cases}.$$

3. The method according to claim 2, wherein the random access preamble $x_{u,v}(n)$ is generated according to $x_{u,v}(n)=x_u((n+vN_{CS}) \bmod N_{ZC})$, where 'n' is an integer value less than or equal to $N_{ZC}-1$.

4. A method for transmitting a random access preamble to a base station, the method performed by a user equipment and comprising:

generating the random access preamble from a Zadoff-Chu (ZC) sequence having a length $N_{ZC}$, wherein the random access preamble is defined by *using the ZC sequence with* cyclic shift ($C_v$) of the ZC sequence *applied to the ZC sequence*; and transmitting the random access preamble to the base station, wherein the $C_v$ satisfies the following Equation 1:

$$C_v=S\cdot\lfloor v/P \rfloor+(v \bmod P)\cdot N_{CS},\ v=0, 1, \ldots, (P\cdot G+R-1), \quad \text{[Equation 1]}$$

where 'G' represents a number of groups defined from the ZC sequence, 'S' represents a length of each of the groups, 'P' represents a number of cyclic shift opportunities for each of the groups, and 'R' represents a number of additional cyclic shifts, and wherein parameters of Equation 1 are given under condition of $N_{ZC}/3 \le d_u \le (N_{ZC}-N_{CS})/2$ by:

$$P=\lfloor (N_{ZC}-2\cdot d_u)/N_{CS} \rfloor,$$

$$S=N_{ZC}-2\cdot d_u+P\cdot N_{CS},$$

$$G=\lfloor d_u/S \rfloor, \text{ and}$$

$$R=\min(\max(\lfloor (d_u-G\cdot S)/N_{CS} \rfloor,0),P),$$

where '$N_{CS}$' is a cyclic shift unit and '$d_u$' is a variable corresponding to a Doppler shift of one subcarrier spacing.

5. The method according to claim 4, wherein the variable is given [by:]

$$d_u = \begin{cases} u^{-1} mod N_{ZC}, & 0 \le (u^{-1} mod N_{ZC}) < N_{ZC}/2 \\ N_{ZC} - (u^{-1} mod N_{ZC}), & N_{ZC}/2 \le (u^{-1} mod N_{ZC}) < N_{ZC} \end{cases} \text{ by:}$$

$$d_u = \begin{cases} m, & 0 \le m < N_{ZC}/2 \\ N_{ZC} - m, & N_{ZC}/2 \le m < N_{ZC} \end{cases}.$$

6. The method according to claim 5, wherein the random access preamble $x_{u,v}(n)$ is generated according to $x_{u,v}(n) = x_u((n+vN_{CS}) mod N_{ZC})$ , where 'n' is an integer value less than or equal to $N_{ZC}-1$.

7. A user equipment for transmitting a random access preamble to a base station, wherein the user equipment is configured to:

generate the random access preamble from a Zadoff-Chu (ZC) sequence having a length $N_{ZC}$, wherein the random access preamble is defined by *using the ZC sequence with* cyclic shift ($C_v$) of the ZC sequence *applied to the ZC sequence*; and transmit the random access preamble to the base station, wherein the $C_v$ satisfies the following Equation 1:

$$C_v=S\cdot\lfloor v/P \rfloor+(v \bmod P)\cdot N_{CS},\ v=0, 1, \ldots, (P\cdot G+R-1), \quad \text{[Equation 1]}$$

where 'G' represents a number of groups defined from the ZC sequence, 'S' represents a length of each of the groups, 'P' represents a number of cyclic shift opportunities for each of the groups, and 'R' represents a number of additional cyclic shifts, and wherein parameters of Equation 1 are given under condition of $N_{CS} \le d_u < (N_{ZC}/3)$ by:

$$P=\lfloor d_u/N_{CS} \rfloor,$$

$$S=2\cdot d_u+P\cdot N_{CS},$$

$$G=\lfloor N_{ZC}/S \rfloor, \text{ and}$$

$$R=\max(\lfloor (N_{ZC}-2\cdot d_u-G\cdot S)/N_{CS} \rfloor,0),$$

where '$N_{CS}$' is a cyclic shift unit and '$d_u$' is a variable corresponding to a Doppler shift of one subcarrier spacing.

8. The user equipment according to claim 7, wherein the variable is given [by:]

$$d_u = \begin{cases} u^{-1} mod N_{ZC}, & 0 \le (u^{-1} mod N_{ZC}) < N_{ZC}/2 \\ N_{ZC} - (u^{-1} mod N_{ZC}), & N_{ZC}/2 \le (u^{-1} mod N_{ZC}) < N_{ZC} \end{cases} \text{ by:}$$

$$d_u = \begin{cases} m, & 0 \le m < N_{ZC}/2 \\ N_{ZC} - m, & N_{ZC}/2 \le m < N_{ZC} \end{cases}.$$

9. The user equipment according to claim 8, wherein the random access preamble $x_{u,v}(n)$ is generated according to $x_{u,v}(n)=x_u((n+vN_{CS}) mod N_{ZC})$, where 'n' is an integer value less than or equal to $N_{ZC}-1$.

10. A user equipment for transmitting a random access preamble to a base station, wherein the user equipment is configured to:

generate the random access preamble from a Zadoff-Chu (ZC) sequence having a length $N_{ZC}$, wherein the random access preamble is defined by *using the ZC sequence with* cyclic shift ($C_v$) of the ZC sequence *applied to the ZC sequence*; and transmit the random access preamble to the base station, wherein the $C_v$ satisfies the following Equation 1:

$$C_v=S\cdot\lfloor v/P \rfloor+(v \bmod P)\cdot N_{CS},\ v=0, 1, \ldots, (P\cdot G+R-1), \quad \text{[Equation 1]}$$

where 'G' represents a number of groups defined from the ZC sequence, 'S' represents a length of each of the groups, 'P' represents a number of cyclic shift opportunities for each of the groups, and 'R' represents a number of additional cyclic shifts, and wherein parameters of Equation 1 are given under condition of $N_{ZC}/3 \le d_u \le (N_{ZC}-N_{cs})/2$ by:

$$P=\lfloor (N_{ZC}-2\cdot d_u)/N_{CS} \rfloor,$$

$$S=N_{ZC}-2\cdot d_u+P\cdot N_{CS},$$

$$G=\lfloor d_u/S \rfloor, \text{ and}$$

$$R=\min(\max(\lfloor (d_u-G\cdot S)/N_{CS} \rfloor,0),P),$$

where '$N_{CS}$' is a cyclic shift unit and '$d_u$' is a variable corresponding to a Doppler shift of one subcarrier spacing.

11. The user equipment according to claim 10, wherein the variable is given [by:]

$$d_u = \begin{cases} u^{-1} mod N_{ZC}, & 0 \le (u^{-1} mod N_{ZC}) < N_{ZC}/2 \\ N_{ZC} - (u^{-1} mod N_{ZC}), & N_{ZC}/2 \le (u^{-1} mod N_{ZC}) < N_{ZC} \end{cases} \text{ by:}$$

$$d_u = \begin{cases} m, & 0 \le m < N_{ZC}/2 \\ N_{ZC} - m, & N_{ZC}/2 \le m < N_{ZC} \end{cases}.$$

12. The user equipment according to claim 11, wherein the random access preamble $x_{u,v}(n)$ is generated according to $x_{u,v}(n)=x_u((n+vN_{CS}) mod N_{ZC})$, where 'n' is an integer value less than or equal to $N_{ZC}-1$.

[13. A method for receiving a random access preamble from a user equipment, the method performed by a base station and comprising:

receiving the random access preamble from the user equipment, wherein the random access preamble is generated by considering a cyclic shift $C_v$ of a Zadoff-Chu (ZC) sequence from the ZC sequence having a length $N_{ZC}$, and wherein the $C_v$ satisfies the following Equation 1:

$$C_v=S\cdot\lfloor v/P\rfloor+(v \bmod P)\cdot N_{CS},\ v=0, 1, \ldots, (P\cdot G+R-1), \quad \text{[Equation 1]}$$

where 'G' represents a number of groups defined from the ZC sequence, 'S' represents a length of each of the groups, 'P' represents a number of cyclic shift opportunities for each of the groups, and 'R' represents a number of additional cyclic shifts, and wherein parameters of Equation 1 are given under condition of $N_{CS}\leq d_u<(N_{ZC}/3)$ by:

$$P=\lfloor d_u/N_{CS}\rfloor,$$

$$S=2\cdot d_u+P\cdot N_{CS},$$

$$G=\lfloor N_{ZC}/S\rfloor, \text{ and}$$

$$R=\max(\lfloor(N_{ZC}-2\cdot d_u-G\cdot S)/N_{CS}\rfloor,0),$$

where '$N_{CS}$' is a cyclic shift unit and '$d_u$' is a variable corresponding to a Doppler shift of one subcarrier spacing.]

[14. A base station for receiving a random access preamble from a user equipment, wherein the base station is configured to:

receive the random access preamble from the user equipment, wherein the random access preamble is generated by considering a cyclic shift $C_v$ of a Zadoff-Chu (ZC) sequence from the ZC sequence having a length $N_{ZC}$, and wherein the $C_v$ satisfies the following Equation 1:

$$C_v=S\cdot\lfloor v/P\rfloor+(v \bmod P)\cdot N_{CS},\ v=0, 1, \ldots, (P\cdot G+R-1), \quad \text{[Equation 1]}$$

where 'G' represents a number of groups defined from the ZC sequence, 'S' represents a length of each of the groups, 'P' represents a number of cyclic shift opportunities for each of the groups, and 'R' represents a number of additional cyclic shifts, and wherein parameters of Equation 1 are given under condition of $N_{CS}\leq d_u<(N_{ZC}/3)$ by:

$$P=\lfloor d_u/N_{CS}\rfloor,$$

$$S=2\cdot d_u+P\cdot N_{CS},$$

$$G=\lfloor N_{ZC}/S\rfloor, \text{ and}$$

$$R=\max(\lfloor(N_{ZC}-2\cdot d_u-G\cdot S)/N_{CS}\rfloor,0),$$

where '$N_{CS}$' is a cyclic shift unit and '$d_u$' is a variable corresponding to a Doppler shift of one subcarrier spacing.]

[15. A method for receiving a random access preamble from a user equipment, the method performed by a base station and comprising:

receiving the random access preamble from the user equipment, wherein the random access preamble is generated by considering a cyclic shift $C_v$ of a Zadoff-Chu (ZC) sequence from the ZC sequence having a length $N_{ZC}$, wherein the $C_v$ satisfies the following Equation 1:

$$C_v=S\cdot\lfloor v/P\rfloor+(v \bmod P)\cdot N_{CS},\ v=0, 1, \ldots, (P\cdot G+R-1), \quad \text{[Equation 1]}$$

where 'G' represents a number of groups defined from the ZC sequence, 'S' represents a length of each of the groups, 'P' represents a number of cyclic shift opportunities for each of the groups, and 'R' represents a number of additional cyclic shifts, and wherein parameters of Equation 1 are given under condition of $N_{ZC}/3\leq d_u\leq(N_{ZC}-N_{CS})/2$ by:

$$P=\lfloor(N_{ZC}-2\cdot d_u)/N_{CS}\rfloor,$$

$$S=N_{ZC}-2\cdot d_u+P\cdot N_{CS},$$

$$G=\lfloor d_u/S\rfloor, \text{ and}$$

$$R=\min(\max(\lfloor(d_u-G\cdot S)/N_{CS}\rfloor,0),P),$$

where '$N_{CS}$' is a cyclic shift unit and '$d_u$' is a variable corresponding to a Doppler shift of one subcarrier spacing.]

[16. A base station for receiving a random access preamble from a user equipment, wherein the base station is configured to:

receive the random access preamble from the user equipment, wherein the random access preamble is generated by considering a cyclic shift $C_v$ of a Zadoff-Chu (ZC) sequence from the ZC sequence having a length $N_{ZC}$, wherein the $C_v$ satisfies the following Equation 1:

$$C_v=S\cdot\lfloor v/P\rfloor+(v \bmod P)\cdot N_{CS},\ v=0, 1, \ldots, (P\cdot G+R-1), \quad \text{[Equation 1]}$$

where 'G' represents a number of groups defined from the ZC sequence, 'S' represents a length of each of the groups, 'P' represents a number of cyclic shift opportunities for each of the groups, and 'R' represents a number of additional cyclic shifts, and wherein parameters of Equation 1 are given under condition of $N_{ZC}/3\leq d_u\leq(N_{ZC}-N_{CS})/2$ by:

$$P=\lfloor(N_{ZC}-2\cdot d_u)/N_{CS}\rfloor,$$

$$S=N_{ZC}-2\cdot d_u+P\cdot N_{CS},$$

$$G=\lfloor d_u/S\rfloor, \text{ and}$$

$$R=\min(\max(\lfloor(d_u-G\cdot S)/N_{CS}\rfloor,0),P),$$

where '$N_{CS}$' is a cyclic shift unit and '$d_u$' is a variable corresponding to a Doppler shift of one subcarrier spacing.]

* * * * *